United States Patent
Deriso et al.

(10) Patent No.: US 12,041,125 B2
(45) Date of Patent: Jul. 16, 2024

(54) STATE MANAGEMENT FOR DEVICE-DRIVEN MANAGEMENT WORKFLOWS

(71) Applicant: VMware LLC, Palo Alto, CA (US)

(72) Inventors: Jonathon Deriso, Atlanta, GA (US); Saransh Bhatnagar, Bangalore (IN); Rahul Parwani, Atlanta, GA (US); Brian Link, Atlanta, GA (US); Mohan Guttikonda, Bangalore (IN); Satish Venkatakrishnan, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/866,053

(22) Filed: Jul. 15, 2022

(65) Prior Publication Data
US 2022/0353327 A1 Nov. 3, 2022

Related U.S. Application Data

(63) Continuation of application No. 17/221,858, filed on Apr. 5, 2021, now Pat. No. 11,470,149.

(30) Foreign Application Priority Data

Jan. 25, 2021 (IN) .............................. 202141003450

(51) Int. Cl.
G06F 15/16 (2006.01)
H04L 41/0604 (2022.01)
(Continued)

(52) U.S. Cl.
CPC ...... *H04L 67/1078* (2013.01); *H04L 41/0627* (2013.01); *H04L 67/01* (2022.05); *H04L 67/1044* (2013.01); *H04L 67/306* (2013.01)

(58) Field of Classification Search
CPC ... H04L 67/1078; H04L 67/01; H04L 67/306; H04L 67/1044; H04L 41/0627
See application file for complete search history.

(56) References Cited

U.S. PATENT DOCUMENTS 7,392,162 B1 6/2008 Srinivasan et al.
9,904,585 B1 2/2018 Islam et al.
(Continued)

OTHER PUBLICATIONS

Deelman, Ewa, et al. "The evolution of the pegasus workflow management software." Computing in Science & Engineering 21.4 (2019): 22-36.

(Continued)

*Primary Examiner* — Normin Abedin
(74) *Attorney, Agent, or Firm* — Kim & Stewart LLP

(57) ABSTRACT

Disclosed are various embodiments for recognizing state changes in client devices and managing the state of client devices using device-driven management workflows. A computing device can receive a state of a client device. The computing device can then determine if the received state matches an expected, compliant state of the client device. When the computing device determines that the received state does not match the expected state, the computing device can identify a remedial workflow that would bring the client device into compliance. The computing device can send the remedial workflow and an instruction to run the remedial workflow to the client device.

20 Claims, 9 Drawing Sheets

(51) Int. Cl.
    *H04L 67/01*     (2022.01)
    *H04L 67/104*     (2022.01)
    *H04L 67/1074*     (2022.01)
    *H04L 67/306*     (2022.01)

(56) References Cited

U.S. PATENT DOCUMENTS

| | | |
|---|---|---|
| 10,122,577 B1 | 11/2018 | Rykowski et al. |
| 10,324,783 B1 | 6/2019 | Saha et al. |
| 10,416,996 B1 | 9/2019 | Samprathi et al. |
| 10,469,304 B1 | 11/2019 | Kempe et al. |
| 10,636,005 B2 | 4/2020 | Kamath et al. |
| 10,673,712 B1 | 6/2020 | Gosar et al. |
| 10,719,336 B1 | 7/2020 | Tsybulnyk et al. |
| 11,082,302 B2 | 8/2021 | Mahajan et al. |
| 2002/0138321 A1 | 9/2002 | Yuan et al. |
| 2003/0009507 A1 | 1/2003 | Shum |
| 2005/0097536 A1 | 5/2005 | Bernstein et al. |
| 2007/0203745 A1 | 8/2007 | Bartsch et al. |
| 2008/0040181 A1 | 2/2008 | Freire et al. |
| 2008/0097816 A1 | 4/2008 | Freire et al. |
| 2008/0120574 A1 | 5/2008 | Heredia et al. |
| 2008/0270597 A1 | 10/2008 | Tenenti |
| 2008/0271022 A1 | 10/2008 | Strassner et al. |
| 2009/0044185 A1 | 2/2009 | Krivopaltsev |
| 2010/0146396 A1 | 6/2010 | Able et al. |
| 2011/0161284 A1 | 6/2011 | Tewari et al. |
| 2012/0246122 A1 | 9/2012 | Short et al. |
| 2012/0304007 A1 | 11/2012 | Hanks et al. |
| 2013/0174047 A1 | 7/2013 | Sivakumar et al. |
| 2014/0013315 A1 | 1/2014 | Genevski et al. |
| 2014/0040840 A1 | 2/2014 | Hysong et al. |
| 2014/0164944 A1 | 6/2014 | Sivakumar et al. |
| 2014/0240745 A1 | 8/2014 | Boldt et al. |
| 2015/0149912 A1 | 5/2015 | Moore |
| 2015/0355935 A1 | 12/2015 | Ozaki et al. |
| 2016/0179449 A1 | 6/2016 | Cho |
| 2016/0234073 A1 | 8/2016 | Maes |
| 2017/0161347 A1 | 6/2017 | Raza et al. |
| 2017/0288959 A1 | 10/2017 | Kelley et al. |
| 2017/0346683 A1 | 11/2017 | Li |
| 2017/0364843 A1 | 12/2017 | Haligowski et al. |
| 2017/0373932 A1 | 12/2017 | Subramanian et al. |
| 2018/0048521 A1 | 2/2018 | Nair et al. |
| 2018/0183762 A1 | 6/2018 | Fetvadjiev et al. |
| 2019/0101882 A1 | 4/2019 | Strinden et al. |
| 2019/0199597 A1 | 6/2019 | Valisammagari et al. |
| 2019/0312910 A1 | 10/2019 | Convertino et al. |
| 2019/0340049 A1* | 11/2019 | Saha .................. G06F 11/0715 |
| 2019/0347168 A1 | 11/2019 | Giannetti |
| 2020/0074115 A1 | 3/2020 | Di Pietro et al. |
| 2020/0111041 A1 | 4/2020 | Levine et al. |
| 2020/0274773 A1 | 8/2020 | Mortsolf et al. |
| 2020/0344131 A1 | 10/2020 | Barton et al. |
| 2020/0379744 A1* | 12/2020 | Bhupati .................. H04L 67/61 |
| 2021/0092015 A1 | 3/2021 | Gardner et al. |
| 2021/0124610 A1 | 4/2021 | Gardner et al. |
| 2021/0149784 A1 | 5/2021 | Soorya et al. |
| 2021/0157312 A1* | 5/2021 | Cella .................. G01M 13/045 |
| 2021/0373942 A1 | 12/2021 | Lv et al. |
| 2022/0164181 A1 | 5/2022 | Reddy et al. |
| 2022/0229742 A1 | 7/2022 | Jain et al. |
| 2022/0231921 A1 | 7/2022 | Link et al. |
| 2022/0239550 A1 | 7/2022 | Parwani et al. |
| 2022/0239735 A1 | 7/2022 | Deriso et al. |

OTHER PUBLICATIONS

Perez-Caparros, David, et al. "An architecture for creating and managing virtual networks." 2013 IEEE 24th Annual International Symposium on Personal, Indoor, and Mobile Radio Communications (PIMRC). IEEE (Year: 2013).

Pla, Albert, et al. "Petri net-based process monitoring: a workflow management system for process modelling and monitoring." Journal of Intelligent Manufacturing 25.3 (2014): 539-554.

Schulz, Karsten A., and Maria E. Orlowska. "Facilitating cross-organisational workflows with a workflow view approach." Data & Knowledge Engineering 51.1 (2004): 109-147.

Van der Aalst, Wil MP, Mathias Weske, and Guido Wirtz. "Advanced topics in workflow management: Issues, requirements, and solutions." Journal of Integrated Design and Process Science 7.3 (2003): 49-77.

Wagner, Thomas, and Daniel Moldt. "Workflow management principles for interactions between petri net-based agents." International Conference on Applications and Theory of Petri Nets and Concurrency. Springer, Cham, 2015.

* cited by examiner

STATE MANAGEMENT FOR DEVICE-DRIVEN MANAGEMENT WORKFLOWS

RELATED APPLICATIONS

This application is a continuation of co-pending U.S. patent application Ser. No. 17/221,858, entitled "STATE MANAGEMENT FOR DEVICE-DRIVEN MANAGEMENT WORKFLOWS" and filed on Apr. 5, 2021, which claims benefit under 35 U.S.C. 119(a)-(d) to Foreign Application Serial No. 202141003450 filed in India entitled "STATE MANAGEMENT FOR DEVICE-DRIVEN MANAGEMENT WORKFLOWS", on Jan. 25, 2021, by VMware, Inc., which is herein incorporated in its entirety by reference for all purposes.

BACKGROUND

Various challenges can arise in the management of enterprise resources using a management service. Access to the capabilities of a device can be managed through the administration of compliance rules defined and enforced by the management service. The proliferation of personal tablet and smartphone devices, for example, has resulted in several companies and organizations allowing employees to use their own devices for enterprise purposes. The use of these personal devices can be associated with productivity gains and cost savings. The concept "bring your own device" (BYOD) for access to enterprise computing systems may have met initial resistance due to security concerns, but more and more companies are now looking to incorporate BYOD policies. This causes enterprises to manage a growing number of different desktop, tablet, and mobile devices, along with various platforms and operating systems available for adoption by users. Many enterprises include employees that work in various locations including a traditional workplace, temporary field workplaces, as well as from home. At the same time, complexity of processes utilized for protecting enterprise resources has increased, requiring higher bandwidth for the constant communication of managed devices with the management service. Personal devices can frequently lose network connectivity, causing security issues, management failures, and delays. There is a need for a more efficient and effective device management paradigm.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Disclosed are various approaches for monitoring the state of client devices and correcting changes in the state using device management workflows on the client device. Many enterprises allow employees to work in various locations including traditional workplaces, temporary or field workplaces, as well as from home. At the same time, the complexity of processes utilized for protecting enterprise resources has increased, requiring higher bandwidth for the constant communication of managed devices with a management service. Personal devices can frequently lose network connectivity, causing security issues, management failures, and delays. Although many of these issues can be addressed using client-device-driven management workflows, unexpected errors can occur when a client device attempts to process or implement a workflow. For example, multiple workflows may depend on different versions of the same library or application to be installed, or workflows may attempt to begin or continue execution during prohibited periods of time. Accordingly, various embodiments of the present disclosure improve the implementation of client-device-driven management workflows by handling conflicts between workflows in a manner that minimizes adverse impacts on the client device.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
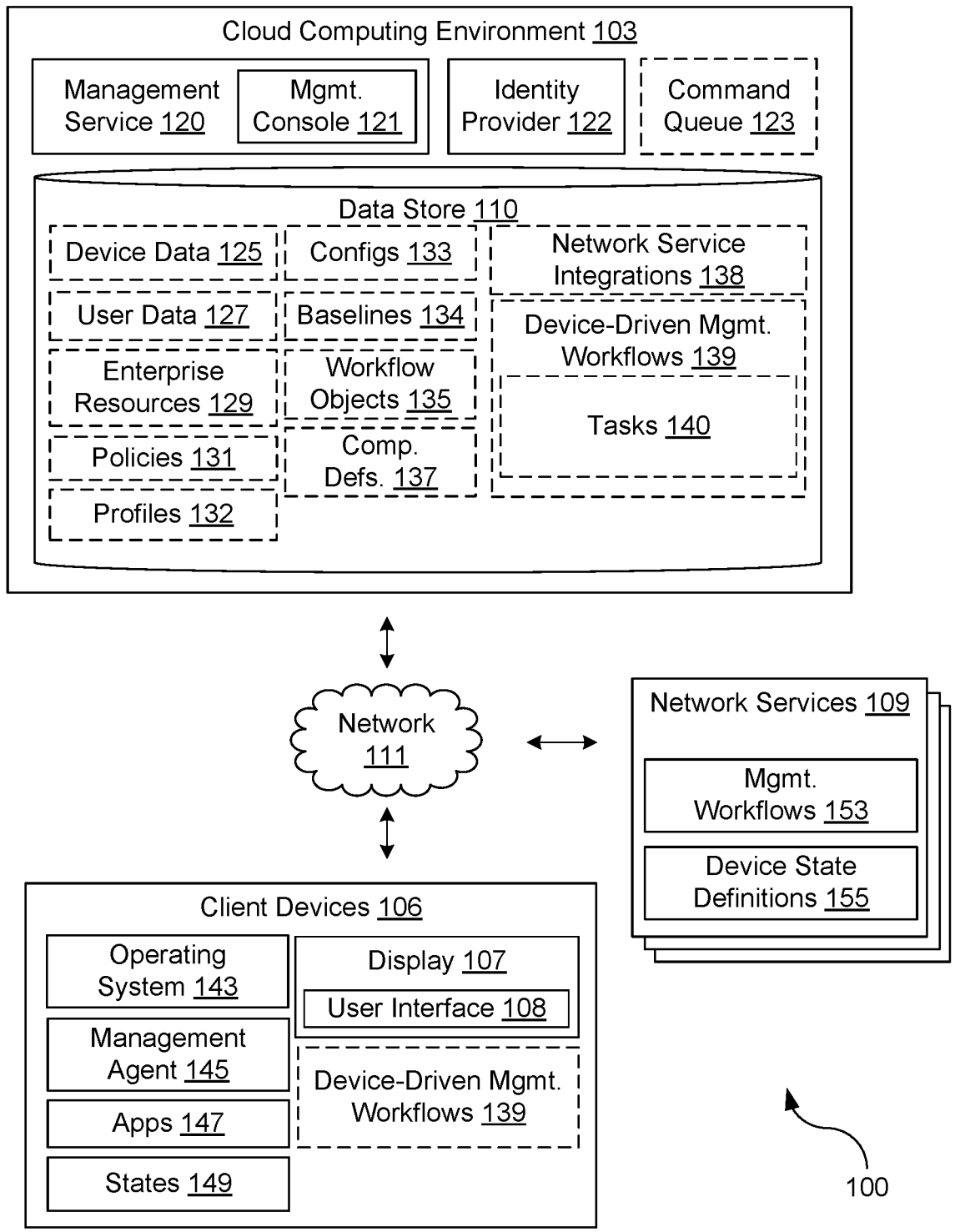
FIG. 1 illustrates an example networked environment that provides tools for device-driven management, according to various examples described herein.

With reference to FIG. 1, shown is a network environment 100 according to various embodiments. The network environment 100 can include a computing environment 103 and one or more client devices 106. The computing environment 103 and the client device(s) 106 can be in data communication with each other via a network 111. In the network environment 100, the computing environment 103 and the client device(s) 106 can communicate with or among each other over the network 111 using one or more network transfer protocols or interconnect frameworks, such as the hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client devices 106 are representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106. The client device 106 can also include one or more displays 107, such as liquid crystal displays (LCDs), gas plasma-based flat panel displays, organic light emitting diode (OLED) displays, electrophoretic ink ("E-ink") displays, projectors, or other types of display devices. In some instances, the display 107 can be a component of the client device 106 or can be connected to the client device 106 through a wired or wireless connection. The client device 106 can also be configured to render a user interface 108 on the display for an application executed by the client device 106. Examples of user interfaces 108 include web pages, application screens, and other graphical user interfaces (GUIs) or text user interfaces (TUIs).

The network 111 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 111 can also include a combination of two or more networks 111. Examples of networks 111 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

The computing environment 103 can operate as an environment for mobile device management or a Unified Endpoint Management (UEM) platform that can manage the client devices 106. In that context, the computing environment 103 can include a data store 110.

The computing environment 103 can also execute a management service 120. The management service 120 can generate a management console 121 that includes a user interface through which an administrator or other user can manage client devices 106 that are enrolled with the management service 120. The administrator can access the management console 121 using a client device 106. An identity provider 122 can be hosted using the computing environment 103 or can be used as a network service 109 in conjunction with the management service 120. The data store 110 includes areas in memory for the storage of device data 125, user data 127, enterprise resources 129, policies 131, profiles 132, configurations 133, baselines 134, and other compliance rules. The data store 110 can also include workflow objects 135, comprehensiveness definitions 137, and device-driven management workflows 139, among other types of data. The management service 120 can operate as a UEM platform that can manage client devices 106 that are enrolled as managed devices with the management service 120. The management service 120 and the management console 121 can be accessible over a public wide area network (WAN) such as the Internet.

Device data 125 can represent information about client devices 106 that are enrolled as managed devices with the management service 120. The device data 125 can include a device identifier, certificates associated with the client device 106, a user identifier identifying the user account with which the device is linked, authentication tokens provided by the identity provider 122 to the client device 106, configuration profiles and compliance policies 131 assigned to the client device 106, and other information regarding management of the client device 106 as an enrolled device. The device data 125 can also include a last-known compliance status associated with a managed client device 106. The compliance status can identify which compliance rules the client device 106 or a user account linked to the client device 106 has violated. For example, the client device 106 may have been taken outside of a specified geofence defined for the client device 106. The device data 125 can also indicate a device type and a platform of the client device 106. The device type can include a desktop-type device, mobile-type device, tablet-type device, and the like. The device type can also refer to a device model or serial number. The platform of the client device 106 can be an indication of an operating system 143 such as Windows® 10, macOS®, iOS®, Android®, as well as other versions of the operating system 143.

User data 127 represents information about users who have user accounts with the management service 120 or an enterprise that uses the management service 120. These users can also have one or more client devices 106 that are enrolled as managed devices with the management service 120. User data 127 can include authentication data and information about network services with which the user is assigned an account. The user data 127 can include a user account that associates a user identifier and one or more device identifiers for client devices 106.

The management service 120 can enroll several client devices 106 for mobile device management services. To begin enrollment, the management service 120 can identify and authenticate one of the client devices 106 and store data related to the client device 106 in the device data 125 for later reference. In some cases, the management service 120 (or a management agent 145, an application 147, or another component executing on the client device 106) can also be registered as a device administrator (at least in part) of the client device 106, permitting the management service 120 to configure and manage certain operating aspects of the client device 106.

Once a client device 106 is enrolled for device management by the management service 120, the management service 120 can provide device-driven management workflows 139 for implementation on the client device 106. The device-driven management workflows 139 can enforce policies 131, profiles 132, configurations 133, security baselines 134, and other compliance rules. The device-driven management workflows 139 can also deploy enterprise resources 129, such as applications 147, data resources, and access to network services 109 that are federated with the identity provider 122.

The management service 120 can also maintain individual and group command queues 123 for the client device 106. A client device 106 can periodically check in and retrieve commands from the command queue 123. The management service 120 can also transmit a check-in notification to the client device 106 that includes instructions to check in. The check-in notification can be transmitted using a push notification service or another notification service, and the client device 106 can check in based on the notification. The management service 120 can provide the device-driven management workflows 139 by placing, in a command queue 123 for the client device 106, a command to execute the device-driven management workflow 139. The client device 106 can check in, retrieve the command, and download the device-driven management workflow 139 from a location specified by the command. Once received, the device-driven management workflow 139 can be implemented by the client device 106 without checking in with the command queue 123, including in scenarios where the client device 106 lacks a connection with the network 111 or otherwise lacks access to the command queue 123.

The management service 120 can also include, in the command queue 123, a command to provide states 149, completion statuses, and other status data associated with execution of the device-driven management workflow 139. The client device 106 can maintain a log of states 149, completion statuses, and other workflow status data regarding execution of the device-driven management workflow 139. The client device 106 can check in, retrieve the command to provide status data, and transmit the states 149, completion statuses, and other specified information from the log. In other examples, the management agent 145 can transmit this data to the management service 120 periodically, on a schedule, and at specified points in the device-driven management workflows 139. The management service 120 can identify success or failure of a portion of the device-driven management workflow 139 based on the states 149 and other information received.

A device-driven management workflow 139 can specify one or more tasks 140 to be performed in order to enforce policies 131, profile 132, configurations 133, and/or security baselines 134 or to deploy enterprise resources 129, such as applications 147, data resources, and access to network services 109 that are federated with the identity provider 122. In some implementations, a device-driven management workflow 139 could be implemented as a state machine that specifies a sequence or series of tasks 140 to be performed based on the current state or states of the of the client device 106.

Each task 140 can represent an action to be performed by the client device 106 as part of a series or sequence of tasks 140 defined by the device-driven management workflow 139, where performance of the task 140 can be based at least in part on the current or previous state 149 or states 149 of the client device 106. Tasks 140 can be defined by using a state machine language (e.g., Amazon States Language) to specify a task 140 or action to be performed based at least in part on the current or previous state 149 of the client device 106. The use of the state machine language can also specify the dependencies of the task 140 (e.g., other tasks 140 which must be performed prior to performance of the defined task 140). In addition, the device-driven management workflow 139 can also be represented using a state machine language, such as Amazon State Language.

Workflow objects 135 can include a set of graphical tools that can be used in the management console 121 to form device-driven management workflows 139. Each workflow object 135 can include instructions formatted using a particular syntax, such as a state machine language (e.g., Amazon State Language). Since the workflow objects 135 can be used to form the device-driven management workflows 139, each device-driven management workflow 139 can also use the syntax of the workflow objects 135. Workflow objects 135 can include instructions that install payloads, policies 131, profiles 132, configurations 133, baselines 134, and other enterprise resources 129. Workflow objects 135 can include instructions for evaluation of device states 149, policies 131, profiles 132, configurations 133, baselines 134, and device state definitions 155 such as an evaluation of device-specific risk levels for a client device 106 based on its states 149. The workflow objects 135 can also include entry points that specify a group of client devices 106, for example, according to user group, device type, platform, other device data 125, and other user data 127.

The workflow objects 135 can also include connector workflow objects 135 between other workflow objects 135. Connector workflow objects 135 can specify conditions and states 149 under which a branch corresponding to that connector is to be implemented. Connector workflow objects 135 can extend from the evaluation workflow object 135. Evaluation workflow objects 135 can include if, while, for, AND, OR, NAND, NOR, and other conditions. The states 149 for respective branch connectors from an if-evaluation workflow object 135 can be mutually exclusive from states 149 for other branch connectors. Alternatively, the states 149 for branch connectors from an if-evaluation workflow object 135 can be evaluated in an order specified by the if-evaluation workflow object 135.

Comprehensiveness definitions 137 can identify a set of device states 149 or device conditions that a device-driven management workflow 139 can include in order to be considered comprehensive. In some cases, a comprehensiveness definition 137 can be generated for a particular enterprise based on the known device data 125 and user data 127 for the enterprise. In other cases, a comprehensiveness definition 137 can be generated for a particular user group or another logical grouping of client devices 106 using a filtered subset of the device data 125 and user data 127 for that logical grouping of client devices 106.

States 149 are a reference to the current or previous state of the client device 106 according to one or more criteria. The state 149 or states 149 of the client device 106 can also change in response to the management agent 145 implementing, processing, or otherwise executing one or more tasks 140 specified by a device-driven management workflow 139. For example, as the management agent 145 installs or updates applications 147 on the client device 106 as specified by a device-driven management workflow 139, the state 149 of the client device 106 would change to reflect the presence of the applications 147 as well as their current versions and any dependencies.

States 149 can include conditions on the client device 106 such as platform of the client device 106, a type of the client device 106, a geolocation of the client device 106, a public or private network to which the client device 106 is communicatively connected, a user group associated with the client device 106, applications 147 that are installed on the client device 106, settings of the client device 106, and other device conditions. The following examples set forth a number of illustrative examples of different types of data that may be referred to or represented by the state 149 of the client device 106. However, it is understood that the following examples are not intended to limit the scope of the state 149 of the client device 106. For example, the state 149 of the client device 106 could refer to or represent a current or previous platform or operating system 143 of the client device 106, including a current or previous version of the platform or operating system 143. The state 149 could also refer to or represent a current or previous sensor value or range of sensor values detected by a sensor of the client device 106. The state 149 could also refer to or represent whether an application 147 is installed on the client device 106, or the specific version of the application 147 installed on the client device 106. The state 149 could also refer to or represent whether a script has been executed on the client device 106, the version of the script that was executed, or the result of the execution of the script. The state 149 could also refer to or represent whether a file is stored on the client device 106, or the version of the file stored on the client device 106. The state 149 could also refer to or represent a total, used, or available amount of storage, memory, compute, or network bandwidth for the client device 106. The state 149 could also refer to or represent a current network address or IP address of the client device 106. The state 149 could also refer to or represent a geolocation or physical location of the client device 106. The state 149 could also refer to or represent a model or type of the client device 106.

The management service 120 can analyze the device data 125 and the user data 127 for a particular logical grouping of client devices 106 and generate a comprehensiveness definition 137 that includes a superset of conditions including platforms, states 149, user groups, networks, geolocations, and applications 147 for the logical grouping of client devices 106. The management service 120 can identify a logical grouping of client devices 106 relevant to a device-driven management workflow 139.

Comprehensiveness definition 137 can be static or dynamic. For example, a user can access the management console 121 and begin designing a device-driven management workflow 139. The management service 120 can analyze the workflow objects 135 of the device-driven management workflow 139 and determine that the device-driven management workflow 139 is limited to a particular user group, a particular operating system, or both. The management service 120 can identify a logical grouping of client devices 106 based on the current limitations of the device-driven management workflow 139. The management service 120 can generate a dynamic workflow-specific comprehensiveness definition 137 that includes a superset of conditions including platforms, states 149, user groups, networks, geolocations, and applications 147 limited to the workflow-specific logical grouping of client devices 106. The management console 121 can provide recommendations for the device-driven management workflow 139 based on the workflow-specific comprehensiveness definition 137.

In another example, the user can select a static comprehensiveness definition 137 that includes conditions including platforms, states 149, user groups, networks, geolocations, and applications 147 for comprehensive coverage of client device 106. Even if the device-driven management workflow 139 is currently limited to devices that do not correspond to the static comprehensiveness definition 137, the management console 121 can provide recommendations for the device-driven management workflow 139 based on the broader set of conditions of the static comprehensiveness definition 137. Recommendations can identify locations such as workflow objects 135 and branching locations where a condition can be added to the device-driven management workflow 139. The comprehensiveness definitions 137 can be used by the management console 121 to provide recommendations for device conditions, states 149, applications 147, and enterprise resources 129 to include in a particular device-driven management workflow 139.

Unlike traditional management workflows that are directed by the management service 120, the device-driven management workflows 139 enable an end user's client device 106 to direct deployment operations to install policies 131, profiles 132, configurations 133, security baselines 134, and other compliance rules, as well as applications 147, certificates, and other enterprise resources 129. To this end, device-driven management workflows 139 can include a branching sequence of instructions that branches based on states 149 that are evaluated on the end user's client device 106. States 149 can be evaluated by a management agent 145 based on instructions in the device-driven management workflows 139 once delivered. As a result, the path that is ultimately executed for a single device-driven management workflow 139 can be different for different client devices 106 that include different states 149.

The management service 120 can also provide a management console 121 as an engine and console interface for device management of the client devices 106. An information technology administrator or user, for example, can view, administer, and update client device-driven management workflows 139 using the management console 121. The client device-driven management workflows 139 can be deployed or transmitted to a set of the client devices 106 to install and enforce policies 131, profiles 132, configurations 133, security baselines 134, and other compliance rules. The client device-driven management workflows 139 can also install applications 147, and other components that enable access to network services 109 and enterprise resources 129. The compliance rules can be collectively administered for several of the client devices 106 by organizing the client devices 106 into several different groups or categories of devices according to organizational, platform, and other factors.

The management console 121 can include a workflow creation user interface area. The workflow creation user interface area can include a drag-and-drop canvas user interface area that shows the workflow objects 135 of a device-driven management workflow 139 in a workflow view; a programming language user interface area that shows the workflow objects 135 of a device-driven management workflow 139 in text instructions or code form; or a list or tree view that shows the workflow objects 135 of a device-driven management workflow 139.

The identity provider 122 can provide single sign-on or identity management capabilities for access to enterprise resources 129 through the management service 120 as well as network services 109. The identity provider 122 can allow users to authenticate his or her identity to obtain an authentication token that can be provided to a network service 109. The identity provider 122 can utilize OAuth, security assertion mark-up language (SAML), or other single sign-on methodologies. The identity provider 122 and management service 120 can communicate so that the management service 120 can revoke or authorize access to various services for users in the enterprise based on status of a client device 106 assigned to the user. The identity provider 122 can also rely on user data 127 in the data store 110. In some examples, the identity provider 122 can rely upon a separate source of user data in a separate data store.

The network service 109 can be embodied as one or more computers, computing devices, or computing systems. Like the computing environment 103, the network service 109 can include one or more computing devices arranged, for example, in one or more server or computer banks. The computing device or devices can be located at a single installation site or distributed among different geographical locations. The network service 109 can include a plurality of computing devices that together embody a hosted computing resource, a grid computing resource, or other distributed computing arrangement. The network service 109 can also be embodied, in part, as certain functional or logical (e.g., computer-readable instruction) elements or modules as described herein. The network service 109 can be provided by an enterprise to its users and can include first- and third-party network services 109 with respect to the management service 120. For example, a network service 109 can include an optional service from a provider of the management service 120 or can be a third-party network service 109. The management workflows 153 and the device state definitions 155 from a third-party network service 109 can be referred to as third-party management workflows 153 and third-party device state definitions 155. The network service 109 can federate its authentication for users of the enterprise to the identity provider 122. The network service 109 can be accessible over the Internet or another public WAN.

An example client device 106 can be enrolled by the management service 120 for device management. A management agent 145 can be installed on a client device 106 to locally manage the device using device-driven management workflows 139 that are provided by the management service 120. The management agent 145 can be installed with elevated privileges or be effectuated through operating system APIs to manage the client device 106 on behalf of the management service 120. The management agent 145 can have the authority to manage data on the client device 106, install, remove, or disable certain applications, or install configuration profiles, such as VPN certificates, Wi-Fi profiles, email profiles, etc.

The management agent 145 can also have the authority to enable or disable certain hardware features of the client device 106 that are specified for a particular branch of a device-driven management workflow 139. The management agent 145 can also place the device into different hardware modes, such as airplane mode, silent mode, do-not-disturb mode, or other modes supported by the client device 106.

The management agent 145 can perform device-driven management workflows 139 to alter the operation of the client device 106 in response to changes in states 149 that are detected on the client device 106. The management agent 145, in one instance, can periodically poll the operating system 143, a data store, or other software and hardware components of the client device 106 to identify states 149 that are indicated in a device-driven management workflow 139.

The device-driven management workflows 139 can include appropriate commands in response to certain states 149. Commands can include generating a notification on the client device 106, sending a notification to an administrator, sending a notification and other compliance data to the management service 120, changing a non-compliant state 149 to a compliant state 149, deleting applications 147 and other enterprise resources, ending a SSO session with the identity provider, removing access to enterprise resources, and other management actions on the client device 106. In one example, the management agent 145 can detect that the client device 106 is out of compliance with respect to a compliance rule indicated in device-driven management workflows 139 and might instruct the management agent 145 to restrict a hardware feature of the client device 106, delete data from the client device 106, or disable certain applications on the client device 106. The management agent 145 can also take other variations of management actions on the client device 106 as directed by the device-driven management workflows 139.

As part of the enrollment process, the management service 120 and/or management agent 145 can be registered as a device administrator of the client device 106, permitting the management service 120 and/or management agent 145 to manage certain operating aspects of the client device 106. In either case, the management service 120 can remotely configure the client device 106 by interacting with the management agent 145. The device-driven management workflows 139 can also indicate various applications 147 and software components to install on the client device 106. Such software components can include, for example, applications, resources, libraries, drivers, device configurations, or other related components. The device-driven management workflows 139 can also indicate network locations where the software components can be downloaded for installation. The device-driven management workflows 139 can also indicate to download and install compliance rules and instruct the management agent 145 and the operating system 143 of the client device 106 to enforce the compliance rules.

The management workflows 153 can include enterprise management workflows 153 for an enterprise employing the management service 120. The network services 109 can include device state definitions 155 and enterprise device state definitions 155. The network services 109 can include previous or legacy management services, community network sites where management workflows 153 and device state definitions 155 can be publicly posted and accessed, private servers to which an enterprise has access, and other services.

The management service 120 can include network service integrations 138 that enable the management service 120 to identify and retrieve first- and third-party resources including the management workflows 153 and device state definitions 155. The management service 120 can display these resources in the management console 121. The management service 120 can also allow management workflows 153 and device state definitions 155 to be imported and translated into device-driven management workflows 139. A device state definition 155 can be reformatted using a particular syntax to form a new or modified workflow object 135, or a device-driven management workflow 139 capable of assessing the device state definitions 155 on a client device 106. A management workflow 153 can be retrieved and reformatted into a device-driven management workflow 139 that is expressed using a set of workflow objects 135.

Figure 2:
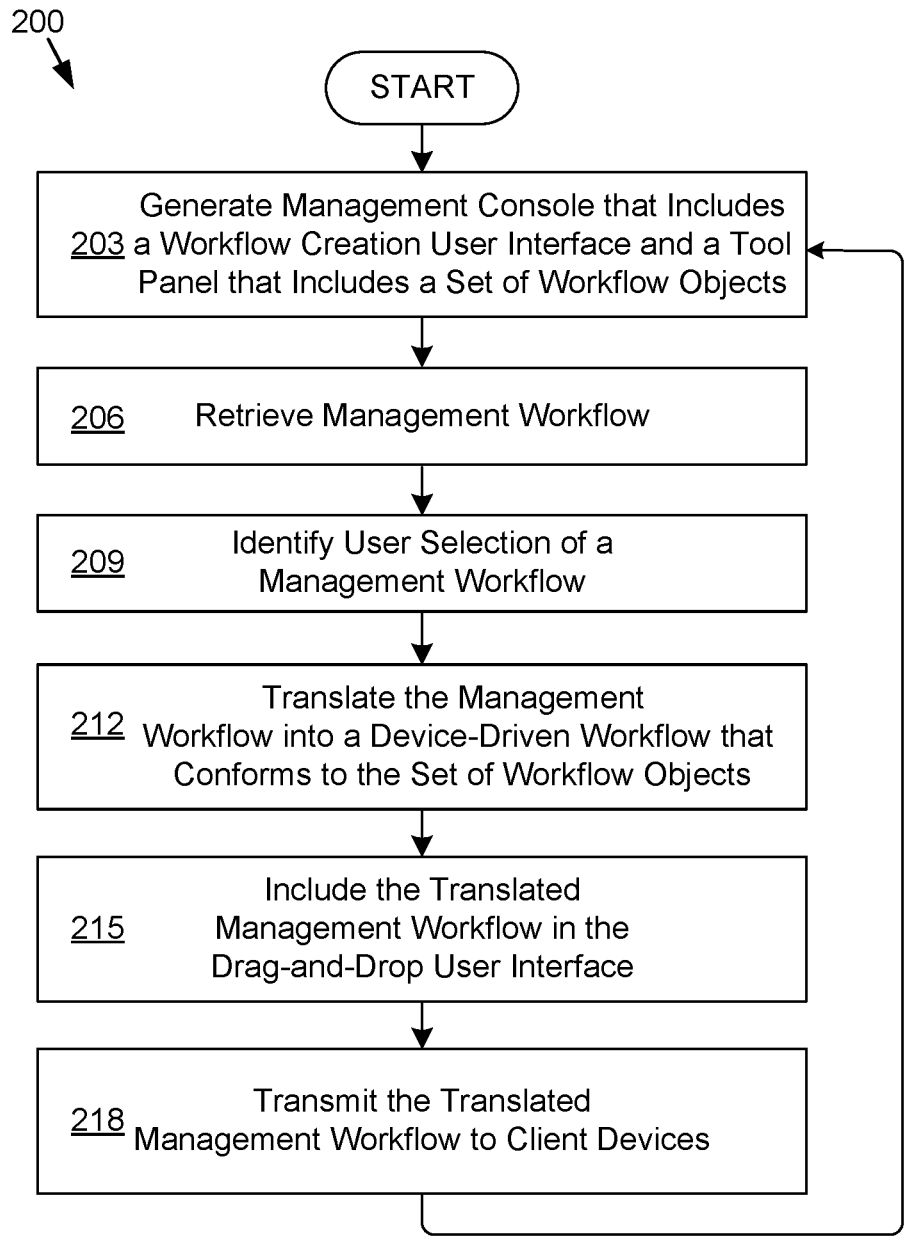
FIG. 2 illustrates a flowchart performed by components of the networked environment for device-driven management, according to various examples described herein.

FIG. 2 shows a flowchart 200 performed by components of the networked environment 100. Specifically, the flowchart 200 describes how the management service 120 provides tools that can import the resources from network services 109 and translate them into workflow objects 135 and device-driven management workflows 139. While the flowchart 200 is described as performed by the management service 120, it can also be considered functionality performed by the management console 121. Certain functionality described for the flowchart 200 can also be performed by other components of the networked environment 100. Segmentation and ordering indicated in the flowchart 200 is for example purposes only. The functionality described for a particular step can be performed in any order relative to the other steps described.

At step 203, the management service 120 can generate a management console 121 that includes a workflow creation user interface area and a tool panel that includes a set of workflow objects 135. The workflow creation user interface area can include a drag-and-drop canvas user interface area that shows the workflow objects 135 of a device-driven management workflow 139 in a workflow view. The workflow objects 135 can be selected, placed, moved, and connected in the drag-and-drop canvas to form device-driven management workflows 139. Other views and manipulation types can also be used as described.

Device-driven management workflows 139 can include a branching sequence of instructions that branches based on states 149 that are evaluated on the end user's client device 106. A path that is ultimately performed and executed for a single device-driven management workflow 139 can be different for different client devices 106 based on the particular states 149 of the devices.

The workflow objects 135 can include instructions that can be performed by the management agent 145, as well as a graphical representation that can be manipulated in the management console 121 to form device-driven management workflows 139. Each workflow object 135 can be represented by an icon or another graphical representation. Workflow objects 135 can include instructions that install payloads, policies 131, profiles 132, configurations 133, baselines 134, and other enterprise resources 129. Workflow objects 135 can include instructions that evaluate device states 149, policies 131, profiles 132, configurations 133, baselines 134, and device state definitions 155 such as evaluation of device-specific risk levels for a client device 106 based on its states 149.

The workflow objects 135 can also include entry points. Entry points can be the starting point for a device-driven management workflow 139. Different types of workflows can have different types of entry points. For example, a provisioning device-driven management workflow 139 can have an entry point that specifies a group of client devices 106 according to user group, device type, platform, other device data 125, and other user data 127. A smart application device-driven management workflow 139 can have an entry point that specifies an application workflow object 135 that triggers its execution. A state evaluation device-driven management workflow 139 can have an entry point that specifies to periodically poll for a state 149. A state evaluation device-driven management workflow 139 can be deployed as an enforcement mechanism that performs a branching set of instructions based on adherence to or violation of policies 131, profiles 132, baselines 134, required or prohibited applications 147, and other states 149.

In step 206, the management service 120 can retrieve resources from a network service 109. The management service 120 can include network service integrations 138 that enable communication with the network services 109. For example, the network service integrations 138 can include components that specify a network address of a network service 109 where resources including management workflows 153 and device state definitions 155 can be retrieved. The management service 120 can parse the text of a management workflow 153 or device state definitions 155 to detect a syntax of the resource. The management service 120 can then identify predetermined translation instructions and translate the resource into a different syntax in order to generate a workflow object 135 or device-driven management workflow 139.

In some cases, the network service 109 can include a public website where the public can post management workflows 153 and device state definitions 155. In other examples, the network service 109 can include a private website where an enterprise can store management workflows 153 and device state definitions 155. The management service 120 can include credentials, certificates, and other components that enable the management service 120 to authenticate with the network service 109. The management service 120 can also allow a user or administrator to log in with a single sign on credential and use the identity provider 122 to authenticate with multiple network services 109.

In step 209, the management service 120 can identify a user-selection of a network-retrieved management resource such as a management workflow 153 or a device state definition 155 from the management console 121. The management service 120 can generate the management console 121 to include user-selectable interface elements for the management workflows 153 and device state definitions 155 that are retrieved from the network service 109. The management service 120 can identify a user selection of an interface element for a management workflow 153 or device state definition 155.

In step 212, the management service 120 can translate the management workflow 153 into a device-driven management workflow 139. The management service 120 can generate a device-driven management workflow 139 that conforms to the set of workflow objects 135 provided by the management console 121. The device-driven management workflow 139 can be a translated version of the management workflow 153. While the example discusses translation of a management workflow 153, the management service 120 can also retrieve a device state definition 155 and translate it into a new workflow object 135 that matches a syntax of the set of workflow objects 135. While translation is indicated after the selection of the management resource, the management service 120 can also automatically translate the management resource before showing it in the management console 121.

In step 215, the management service 120 can include the translated version of the management workflow 153 in the drag-and-drop or canvas user interface area of the management console 121. The user can click or click-and-drag the translated version of the management workflow 153 from an imported resources area, or another tool user interface element of the management console 121. The translated version of the management workflow 153 can then be shown in the drag-and-drop or canvas user interface area. The user can then edit workflow objects 135 of the translated version of the management workflow 153 components through the management console 121.

In step 218, the management service 120 can transmit the translated version of the management workflow 153 to client devices 106. For example, the management service 120 could save the translated version of the management workflow 153 to a command queue 123. At periodic intervals, the management agent 145 could send a request to the management service 120 for any objects (e.g., translated versions of the management workflow 153) stored in the command queue 123 for the client device 106, and the management service 120 could provide them in response. In some implementations, the management agent 145 could directly retrieve objects stored in the command queue 123 without sending a request to the management service 120.

Once received, the client devices 106 can evaluate states 149 and perform a client-device-specific path or route through the client-device-driven management workflow 139 that is based on the translated version of the management workflow 153. Alternatively, the management service 120 can save the device-driven management workflow 139 for later deployment. The device-driven management workflow 139 can perform any of the functionality discussed. The device-driven management workflow 139 can also be saved as a smart resource workflow object 135 or another multi-step workflow object 135 for use in other device-driven management workflows 139. A smart resource workflow object 135 or another multi-step workflow object 135 can correspond to a device-driven management workflow 139 that can be represented by a single icon or graphic in other device-driven management workflows 139.

A smart resource workflow object 135 can refer to a device-driven management workflow 139 for comprehensive or universal deployment of enterprise resources 129 such as applications 147, scripts, databases, or files for a set of conditions specified by a comprehensiveness definition 137. As a result, the smart resource workflow object 135 can be used in other device-driven management workflows 139. For example, a single smart resource workflow object 135 can be used to deploy multiple different versions of an application 147 or a script depending on a platform or operating system 143 of a client device 106. A single smart resource workflow object 135 can be used to install or provide access to different databases or files based on a user group or security state 149 of the client device 106.

Figure 3:
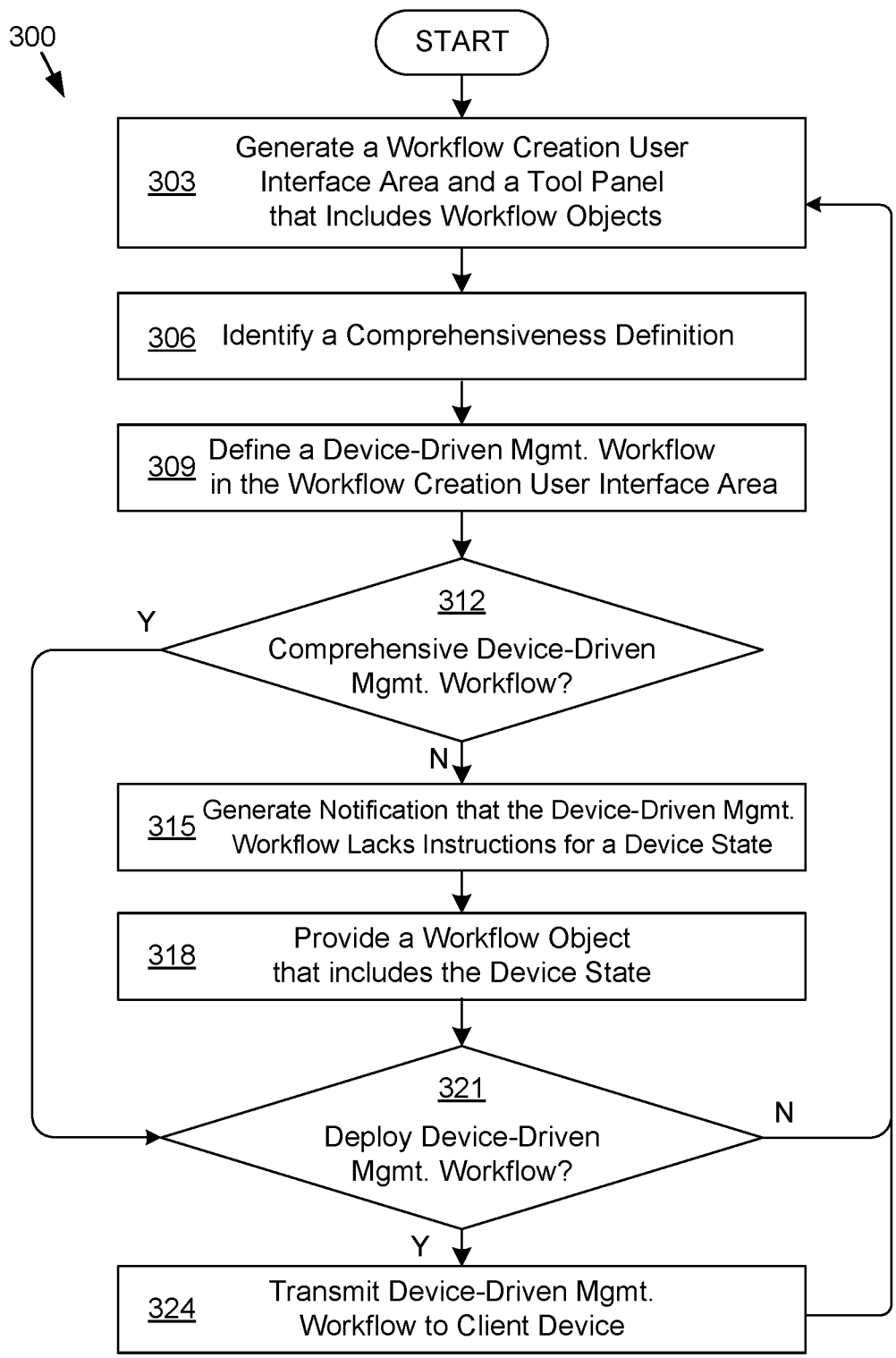
FIG. 3 illustrates another flowchart performed by components of the networked environment for device-driven management, according to various examples described herein.

FIG. 3 shows a flowchart 300 performed by components of the networked environment 100. Specifically, the flowchart 300 describes how the management service 120 provides tools that can create universal or comprehensive device-driven management workflows 139. This can include universal or smart applications as well as device-driven management workflows 139 for deployment or installation of enterprise resources 129, evaluation and enforcement of compliance rules on the client device 106, and other purposes. While the flowchart 300 is described as performed by the management service 120, it can also be considered functionality performed by the management console 121. Certain functionality described for the flowchart 300 can also be performed by other components of the networked environment 100. Segmentation and ordering indicated in the flowchart 300 is for example purposes only. The functionality described for a particular step can be performed in any order relative to the other steps described.

At step 303, the management service 120 can generate a management console 121 that includes a workflow creation user interface area and a tool panel that includes a set of workflow objects 135. The workflow creation user interface area can include a drag-and-drop canvas user interface area that shows the workflow objects 135 of a device-driven management workflow 139 in a workflow view. The workflow objects 135 can be selected, placed, moved, and connected in the drag-and-drop canvas to form device-driven management workflows 139. Other views and manipulation types can also be used as described.

At step 306, the management service 120 can identify a comprehensiveness definition 137 to use for a device-driven management workflow 139 shown in the workflow creation user interface area. For example, the management service 120 can analyze the workflow objects 135 of the device-driven management workflow 139 and identify a logical grouping of client devices 106 based on current limitations of the device-driven management workflow 139. The management service 120 can generate a dynamic workflow-specific comprehensiveness definition 137 that includes a superset of conditions including platforms, states 149, user groups, networks, geolocations, and applications 147 limited to the workflow-specific logical grouping of client devices 106. Alternatively, the user can select a predetermined or static comprehensiveness definition 137.

In step 309, the management service 120 can define a device-driven management workflow 139 based on user interactions identified through the workflow creation user interface area of the management console 121. For example, a user can drag one or more workflow objects 135 into the workflow creation user interface area and link them using connectors. The user can also select workflow objects 135, including the connectors, in order to edit specifications of the various workflow objects 135. The user can also incorporate management workflows 153, device state definitions 155, and modified versions of these management resources into the device-driven management workflow 139.

In step 312, the management service 120 can determine whether the device-driven management workflow 139 is comprehensive. For example, the management service 120 can compare the workflow objects 135 of the device-driven management workflow 139 to the comprehensiveness definition 137. The comprehensiveness definition 137 can be a static comprehensiveness definition 137 or a dynamic comprehensiveness definition 137 that changes based on a detected set of limitations applicable to all paths through the device-driven management workflow 139. If the device-driven management workflow 139 includes all or a threshold percentage or amount of the conditions specified in the comprehensiveness definition 137, then the device-driven management workflow 139 can be considered comprehensive and the process can proceed to step 321. Otherwise, the device-driven management workflow 139 can be considered not comprehensive, and the process can move to step 315.

In step 315, the management service 120 can generate a notification that the device-driven management workflow 139 lacks instructions for a condition or device state 149 that is specified by the comprehensiveness definition 137. For example, the device-driven management workflow 139 can lack a path corresponding to a network condition (e.g., trusted, untrusted), geolocation, platform, or another condition. The device-driven management workflow 139 can lack instructions to ensure installation of a certain application 147 or another enterprise resource 129 that is specified by the comprehensiveness definition 137. The notification can be included in a pop-up user interface element or another informational or administrative user interface panel of the management console 121.

In step 318, the management service 120 can provide a workflow object 135 that includes the device state 149 that is specified by the comprehensiveness definition 137. For example, the management console 121 can include a pop-up user interface element or another user interface panel that shows the workflow object 135 that includes the device state 149. The workflow object 135 can also be highlighted or otherwise graphically emphasized in a toolset or another area of the management console 121. A user can select the workflow object 135, as shown in the management console 121, and incorporate the workflow object 135 into device-driven management workflow 139. Alternatively, the management service 120 can show the state 149 in a pop-up user interface element or another user interface panel, and the user can select or manipulate the state 149 to incorporate the state 149 into an existing workflow object 135.

In step 321, the management service 120 can determine whether to deploy the device-driven management workflow 139. For example, the management console 121 can include a user interface element through which a user can indicate to deploy the device-driven management workflow 139 to a set of client devices 106. If the device-driven management workflow 139 is to be deployed, then the process can proceed to step 324. Otherwise, the process can proceed to step 303.

In step 324, the management service 120 can transmit the device-driven management workflow 139 to a set of client devices 106. This could be done, for example, by placing the device-driven management workflow 139 into one or more command queues 123 from which the client devices 106 subsequently retrieve the device-driven management workflows 139. The set of client devices 106 can correspond to a user group, a device group, a platform-based group, or another logical grouping of client devices 106. The logical grouping of client devices 106 can be indicated in an entry point workflow object 135 of the device-driven management workflow 139.

Figure 4:
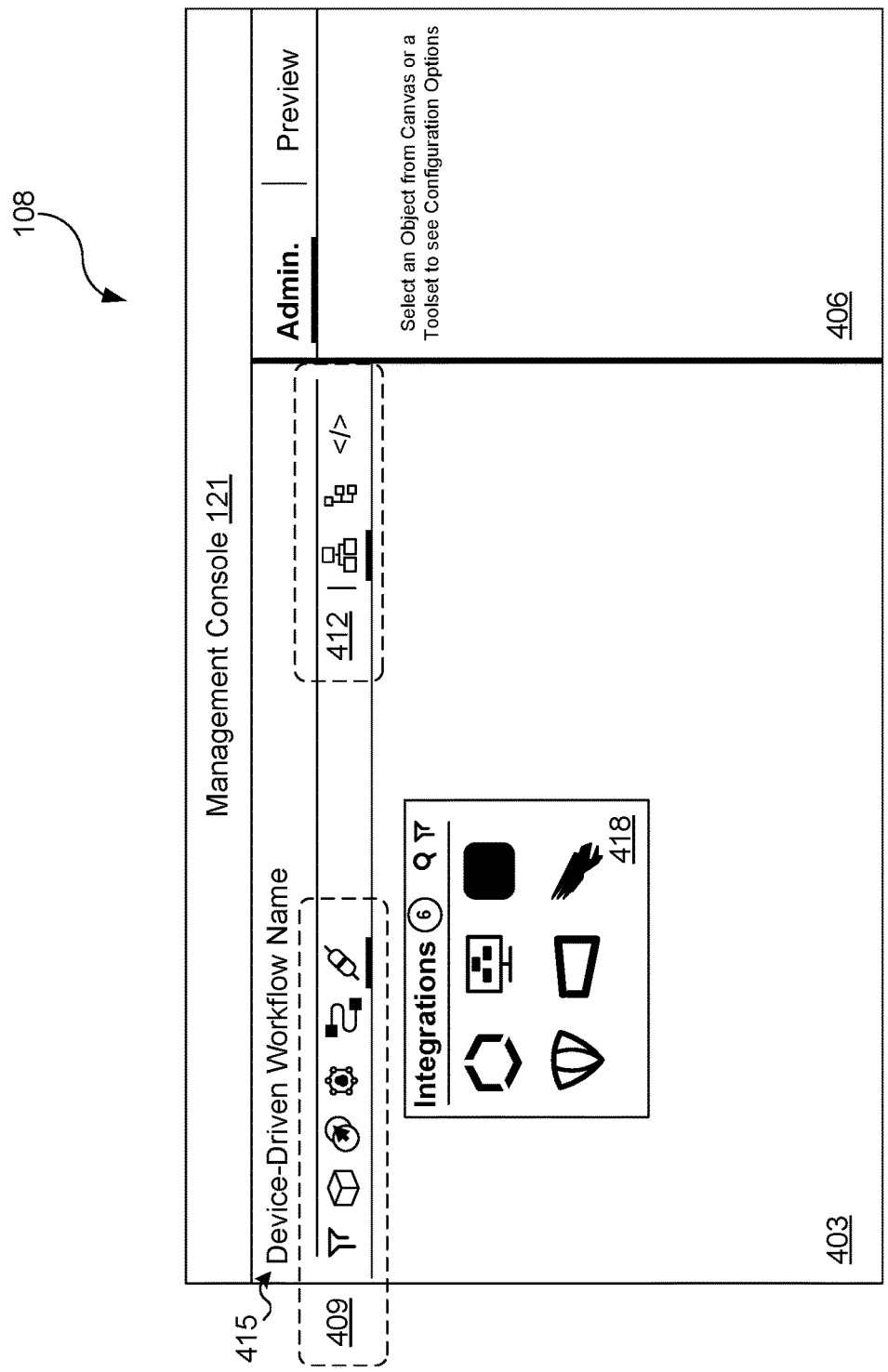
FIG. 4 illustrates an example user interface that provides tools for device-driven management using components of the networked environment, according to various examples described herein.

FIG. 4 shows an example user interface 108 of the management console 121. The user interface can include tools for device-driven management. For example, the management console 121 can include a workflow creation area 403, as well as a side panel 406 for options and configuration. The workflow creation area 403 can include a toolset selector 409, an interface type selector 412, as well as a name or identifier 415 of a device-driven management workflow 139.

The workflow creation area 403 can include a drag-and-drop canvas user interface that shows the workflow objects 135 of a device-driven management workflow 139 in a graphical workflow view that includes icon-type or other graphical representations of workflow objects 135 connected to one another using line-type connector workflow objects 135. Using the interface type selector 412, a user can change the workflow creation area 403 to include a programming language user interface area that shows the workflow objects 135 of a device-driven management workflow 139 in text instructions or code form; or a list or tree view that shows the workflow objects 135 of a device-driven management workflow 139. In some examples, the drag-and-drop canvas user interface can be in the workflow creation area 403, while the side panel 406 includes the programming language or the tree view of the device-driven management workflow 139.

The toolset selector 409 can include, from left to right, a filter icon, an inventory icon, a commands icon, a groups icon, a connector icon, a network service integrations icon, among others. A user selection of the filter icon can cause the management console 121 to show a toolset filtering element to filter the toolsets shown in the toolset selector 409.

A user selection of the inventory icon can cause the management console 121 to show an inventory toolset. The inventory toolset can include workflow objects 135 corresponding to enterprise resources 129 such as databases, certificates, files, scripts, and applications 147.

A user selection of the commands icon can cause the management console 121 to show a commands toolset. The commands toolset can include workflow objects 135 corresponding to commands that can be performed by an operating system 143, an application 147, or other instructions executed on the client device 106. For example, commands can include a reboot command, a logout command, an enterprise wipe command that removes enterprise resources 129 from the client device 106, a command to generate a local notification, a command to transmit a message, a command to update data in a local or remote database, a command to perform an action using a network service 109 or the management service 120, a command to set a host name of the client device 106, a command to set a wallpaper of the client device 106, and other commands.

A user selection of the groups icon can cause the management console 121 to show a groups toolset. The groups toolset can include workflow objects 135 corresponding to user groups, device groups, and other logical groupings of client devices 106. The groups toolset can be used to modify workflow objects 135 in the device-driven management workflow 139. For example, a group workflow object 135 can modify a connector workflow object 135, such as an entry point, a line connector, or a condition based on the specified group.

A user selection of the connectors icon can cause the management console 121 to show a connectors toolset. The connectors toolset can include workflow objects 135 corresponding to connectors including entry points, line connectors, and conditions. Entry point workflow objects 135 can be used to start a device-driven management workflow 139. If the device-driven management workflow 139 is a complete standalone workflow, then the entry point can specify a specific client device 106, or a user group, a device group, or another logical grouping of client devices 106 for the device-driven management workflow 139.

In this example, the toolset selector 409 indicates that the network service integrations icon is selected. The network service integrations toolset 418 can show a number of icons corresponding to network service integrations 138 with network services 109. The network service integrations toolset 418 can provide an indicator of a number of network service integrations 138 that are currently set up. The example here shows that there are six (6) network service integrations 138 currently configured to import management workflows 153, device state definitions 155, and other first- and third-party management resources for a device-driven management workflow 139.

Selection of a particular network service integration from the network service integrations toolset 418 can update the network service integrations toolset 418 to show management workflows 153, device state definitions 155, and other management resources. Alternatively, selection of a particular network service integration from the network service integrations toolset 418 can update the side panel 406 to show management workflows 153, device state definitions 155, and other management resources.

The network service integrations toolset 418 can also include a search functionality and a filter functionality. For example, a user can select a search icon to bring up a search element through which a user-entered textual search query can be entered. The management console 121 can update the network service integrations toolset 418 or the side panel 406 to show network service integrations 138, management workflows 153, device state definitions 155, and other management resources corresponding to the query.

A user can select a filter icon of the network service integrations toolset 418 to bring up a filtering element through which a set of categories can be user-selected. The management console 121 can update the network service integrations toolset 418 or the side panel 406 to show network service integrations 138, management workflows 153, device state definitions 155, and other management resources corresponding to the user-selected category.

Figure 5:
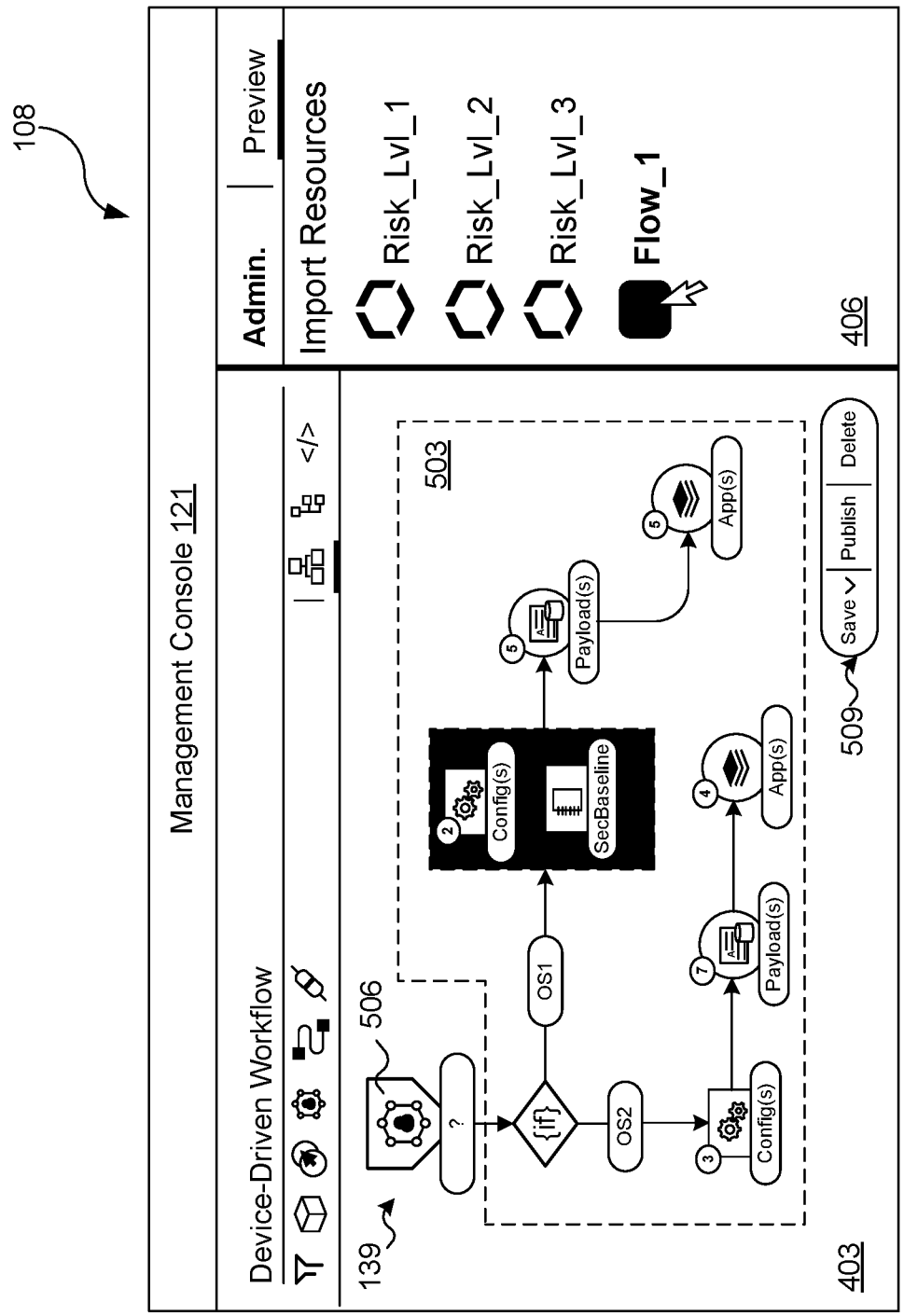
FIG. 5 illustrates another example user interface that provides tools for device-driven management using components of the networked environment, according to various examples described herein.

FIG. 5 shows an example user interface 108 of the management console 121. The user interface can include tools for device-driven management. For example, the management console 121 can include a workflow creation area 403, a side panel 406, and other components, as discussed.

The workflow creation area 403 can include a device-driven management workflow 139 that is created using workflow objects 135. The side panel 406 can include a number of management resources that a user can select for inclusion in the workflow creation area 403 and the device-driven management workflow 139. The management resources can include device state definitions 155 and a management workflow 153, which can include first- and third-party management resources that are retrieved from network services 109 using network service integrations 138.

A user can manipulate a cursor, touchscreen, or another input device to select the management workflow 153 "Flow_1." The user can click, click-and-drag, or otherwise select the management workflow 153 and add it to the workflow creation area 403 as a set of workflow objects 135 of the device-driven management workflow 139. The workflow object group 503 can be a translated version of the management workflow 153 formatted as workflow objects 135, as discussed. The user can then edit the device-driven management workflow 139. For example, the user can add or edit an entry point 506 to specify a logical grouping of client devices 106 for the device-driven management workflow 139. The management console 121 also includes a user interface element 509 that can be user-manipulated to save, publish, or delete the device-driven management workflow 139. Publishing the device-driven management workflow 139 can involve transmitting the device-driven management workflow 139 to client devices 106 specified by the entry point 506.

The workflow object group 503 shows workflow objects 135 including an if-condition workflow object 135, an OS1 connector workflow object 135, and an OS2 connector workflow object 135, among others. When executed by a client device 106, the device-driven management workflow 139 or the management agent 145 can analyze states 149 to determine an operating system 143 of the client device 106. If the operating system 143 corresponds to that specified by the OS1 connector workflow object 135, then the branch of instructions corresponding to the OS1 connector workflow object 135 can be performed. If the operating system 143 corresponds to that specified by the OS2 connector workflow object 135, then the branch of instructions corresponding to the OS2 connector workflow object 135 can be performed. As a result, the device-driven management workflow 139 includes a branching sequence of instructions that branches based on states 149 that are evaluated on the end user's client device 106.

As a nonlimiting example, the branch of instructions corresponding to the OS1 connector workflow object 135 can install two configurations 133 and a security baseline 134. The bounding box around the two configurations 133 and the security baseline 134 can indicate that these workflow objects 135 are order agnostic, can be performed in any order including with partial or total concurrence, simultaneously, or otherwise. Thereafter, the branch of instructions indicates to install five payloads of data or other enterprise resources 129, and subsequently install five applications 147. The branch of instructions corresponding to the OS2 connector workflow object 135 can install three configurations 133, subsequently install seven payloads, and subsequently install four applications 147.

The management resources can also include risk levels and other device state definitions 155. The risk level definitions can be generated by a network service 109. In some examples, the risk level definitions can be made in the same syntax of the workflow objects 135, and in other examples the management service 120 can translate a first- or third-party syntax into a different syntax used by the workflow objects 135 to create the new workflow objects 135.

Risk level definitions can be used to modify workflow objects 135 in the device-driven management workflow 139. For example, a risk level definition workflow object 135 can modify a connector workflow object 135, such as an entry point, a line connector, or a condition based on the specified risk level definition. Risk level definitions can define a set of states 149 that are associated with that risk level. When executed on a client device 106 as part of a device-driven management workflow 139, the states 149 can be detected and compared to those specified by the risk level definition workflow object 135. The risk level definitions can be initially generated by machine learning or another method.

The risk level definitions can be periodically updated by the network service 109. However, the risk level definition workflow object 135 can specify a network location where the states 149 specified by the risk level definition can be updated to reflect changing security risks faced by client devices 106. The device-driven management workflow 139 can be deployed to a client device 106, and the client device 106 can update the states 149 that trigger the risk level definition workflow object 135. The management agent 145 can retrieve a risk level definition periodically and in response to a detected change of a state 149 of the client device 106. This can be achieved without contacting the management service 120 for a new or updated device-driven management workflow 139. While discussed with respect to risk level definitions, any device state definition 155 can specify a network location of a network service 109 that enables the client device 106 to update a workflow object 135 for that device state definition 155.

The management agent 145 can generate a risk score for the client device 106 based on the states 149 and the risk level definition. In other cases, the management agent 145 can periodically transmit states 149 to the network service 109 and can receive a risk score for the client device 106. The management agent 145 can compare the risk score to the risk level to determine whether to perform a branch of the device-driven management workflow 139 that corresponds to the risk level.

The if-condition workflow object 135, the OS1 connector workflow object 135, the OS2 connector workflow object 135, and other workflow objects 135 can be edited based on the device state definitions 155. For example, a device state definition 155, "Risk_Lvl_1" can be used to modify the OS1 connector workflow object 135 to replace a state 149 corresponding to OS1 with a state 149 corresponding to Risk_Lvl_1. The resulting Risk_Lvl_1 connector workflow object 135 can perform the corresponding branch of instructions when the management agent 145 detects a state 149 specified for device state definition 155 Risk_Lvl_1.

Figure 6:
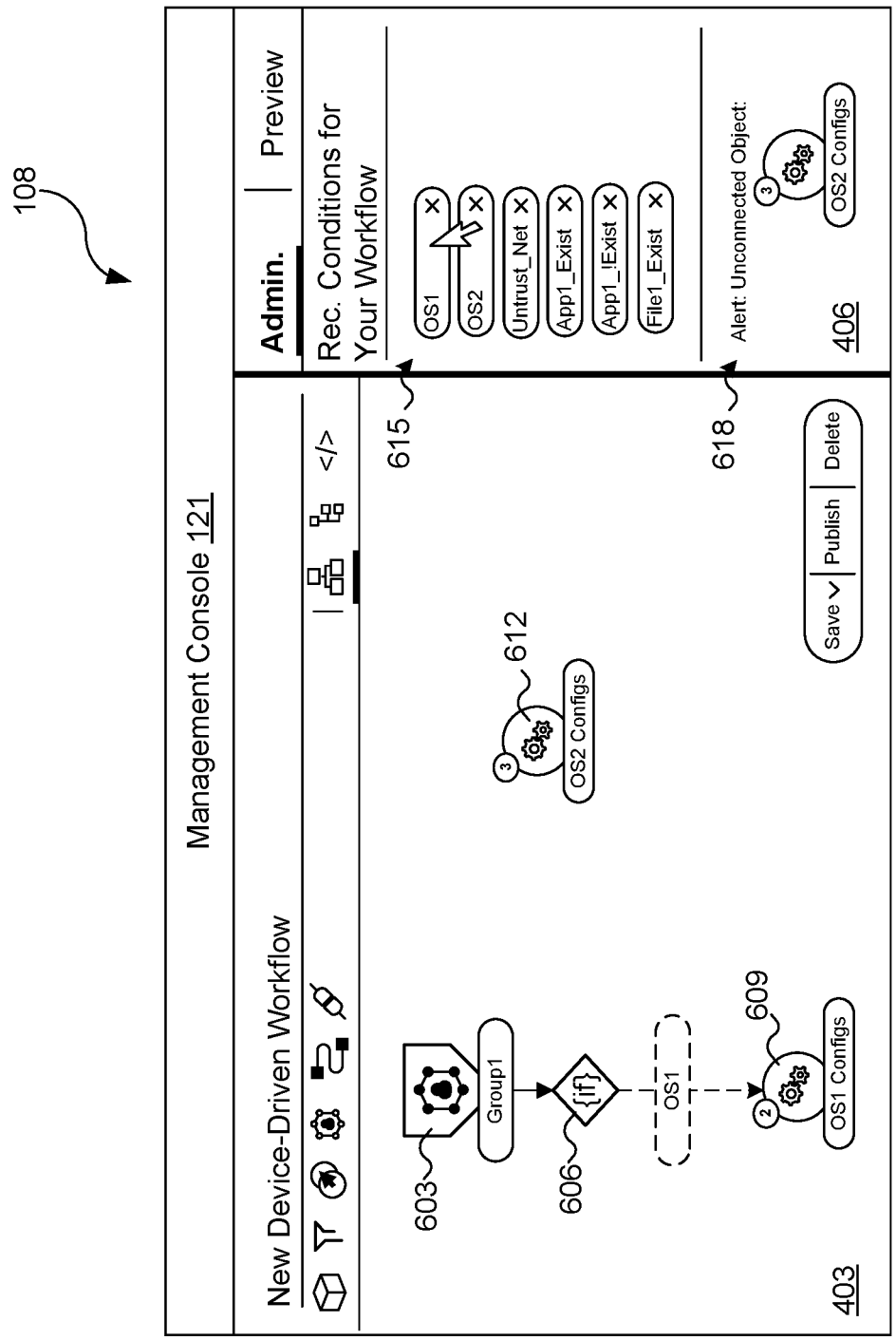
FIG. 6 illustrates another example user interface that provides tools for device-driven management using components of the networked environment, according to various examples described herein.

FIG. 6 shows another example user interface 108 of the management console 121. The user interface can include tools for device-driven management. The management console 121 can include a workflow creation area 403, a side panel 406, and other components, as discussed.

The workflow creation area 403 can include an entry point workflow object 603 that specifies a user or device group "group 1." The workflow creation area 403 can also include an if-condition workflow object 606 connected to the entry point workflow object 603 without any branches or conditional actions specified. A user can drag or otherwise manipulate the management console 121 to place a configuration workflow object 609 and a configuration workflow object 612 into the workflow creation area 403. While the graphical representation of the configuration workflow object 609 states "OS1 Configs" the underlying workflow object 135 can specify an object type as a configuration installation type and can further specify an identifier of an operating system corresponding to "OS1." Likewise, an underlying workflow object 135 for the representation of configuration workflow object 612 can specify an object type as a configuration installation type, and can further specify an identifier of another operating system, this time corresponding to "OS2."

The management service 120 can analyze the workflow objects 135 that are in the workflow creation area 403 to identify recommendations to form a device-driven management workflow 139. The management service 120 can determine that the configuration workflow object 609 corresponds to an operating system "OS1" while the workflow object 612 corresponds to a mutually-exclusive operating system "OS2." As a result, the management service 120 can determine that these configuration workflow objects 609 and 612 can only be used together in a single device-driven management workflow 139 if there are branches that are performed in response to detected states 149 for the associated operating systems.

The management service 120 can update the side panel 406 or another user interface area of the management console 121 to include recommendations 615. Recommendations 615 can include a condition workflow object 135 that specifies an operating system "OS1." The management console 121 can also include a recommendation for a condition workflow object 135 that specifies an operating system "OS2." In some cases, a user selection of the recommended condition workflow object 135 can cause the object to appear connected in the device-driven management workflow 139. In other cases, the user can draw the connector and drag or otherwise modify the connector to include the recommended condition workflow object 135 that specifies the operating system "OS1."

The recommendations 615 can also include recommendations based on a comprehensiveness definition 137. The management service 120 can analyze the workflow objects 135 that are in the workflow creation area 403 based on a comprehensiveness definition 137 to identify comprehensiveness recommendations. A comprehensiveness definition 137 can identify a set of device states 149 or device conditions that the device-driven management workflows 139 can include in order to be considered comprehensive for group 1 or another set of client devices 106 specified by entry point workflow object 603. The management service 120 can identify that there are no conditional branches corresponding to states 149 corresponding to an untrusted network, the existence of app1, non-existence of app1, and the existence of file1 on a client device 106. The management service 120 can update the recommendations to include conditions "Untrust_Net," "App1_Exist," "App1_!Exist," and "File1_Exist."

An administrator can decide that for this particular device-driven management workflow 139, no conditional actions or branch of instructions need to be performed for a certain condition. The management console 121 can include a user interface element that when selected can mark the recommendation as considered, and/or remove the recommendation. The management console 121 can include alerts 618 that specify workflow objects 135 and branches that are disconnected or can otherwise result in non-functionality.

Figure 7:
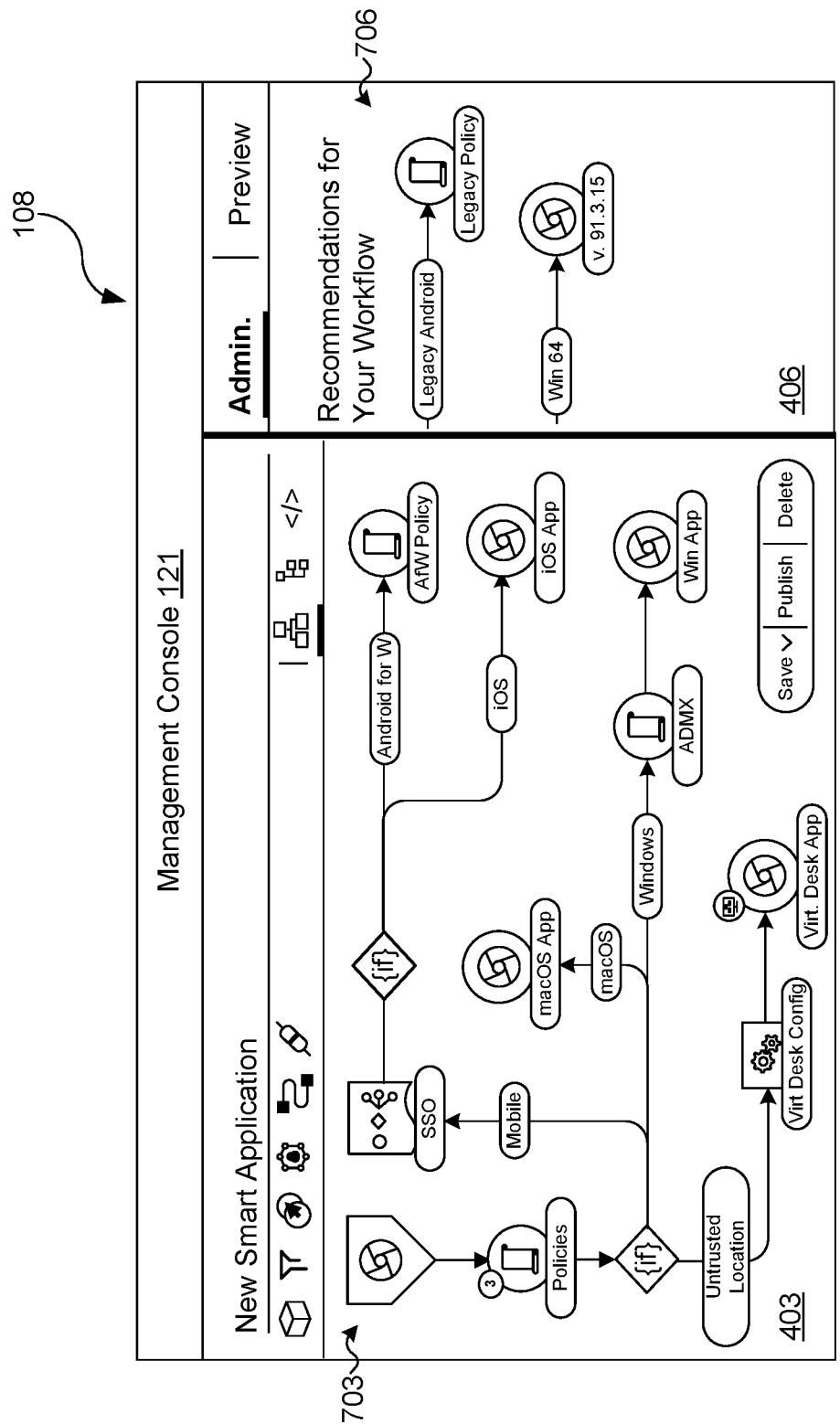
FIG. 7 illustrates another example user interface that provides tools for device-driven management using components of the networked environment, according to various examples described herein.

FIG. 7 shows another example user interface 108 of the management console 121. The user interface can include tools for device-driven management. The management console 121 can include a workflow creation area 403, a side panel 406, and other components, as discussed. Generally, this drawing shows how the management console 121 provides tools to create a smart application 703 for use in a device-driven management workflow 139.

The smart application 703 can be considered a device-driven management workflow 139 that defines a branching set of instructions for deployment of an application 147. The entry point workflow object 135 of the smart application 703 can specify an application workflow object 135, rather than a logical group of client devices 106. A workflow of the smart application 703 can be invoked and performed if the application workflow object 135 is encountered in a device-driven management workflow 139. While this example describes a smart application 703 for deployment of an application 147, the description is generally applicable to smart resources for deployment of a script, a database, a file or set of files, a certificate, or another enterprise resource 129.

The smart application 703 can be a comprehensive device-driven management workflow 139 based on a comprehensiveness definition 137 for smart applications 137. This enables the smart application 703 to successfully provide access to an application 147 in different ways and for a wide variety of client devices 106, based on the states 149 of each client device 106.

In this nonlimiting example, the smart application 703 can install a number of policies 131 and then evaluate an if-condition based on states 149 of a client device 106. In this example, the if-condition can be configured to evaluate whether the client device 106 is in a trusted or untrusted geolocation or network location. If the location is untrusted, then the smart application 703 can perform a branch of instructions that installs a configuration 133 for virtual desktops and then configures the client device 106 to access a virtual desktop version of the application 147.

If the location is trusted, then the smart application 703 can evaluate whether the platform of the client device 106 is a mobile platform or a desktop platform such as macOS® or Windows®. If the platform of the client device 106 is macOS®, then a macOS® version of the application 147 can be installed. If the platform of the client device 106 is Windows®, then a Windows® version of the application 147 can be installed. If the platform of the client device 106 is a mobile platform, then a single sign on process can be performed on the client device 106. Thereafter, if the mobile platform of the client device 106 is an Android® for Work compatible platform, then an Android® for Work policy 131 can be installed, since the application 147 can be a default application 147 that is preinstalled on Android® platforms. If the mobile platform of the client device 106 is an iOS® platform, then an iOS® version of the application 147 can be installed.

The management console 121 can include recommendations 706 that are generated based on a comprehensiveness definition 137. The management service 120 can analyze the workflow objects 135 of the smart application 703 based on a comprehensiveness definition 137. The comprehensiveness definition 137 can identify a set of device states 149 or device conditions that the device-driven management workflows 139 can include in order to be considered comprehensive for a smart application.

The management service 120 can determine that the comprehensiveness definition 137 indicates that a legacy policy 131 should be used for legacy Android® platform client devices 106 and that the smart application 703 does not provide the legacy policy 131 for legacy Android® platform client devices 106. The management service 120 can generate a recommendation that provides a set of workflow objects 135 that provides the legacy policy 131 for legacy Android® platform client devices 106. A user can drag-and-drop, select, or otherwise manipulate the recommended set of workflow objects 135 to include it in the smart application 703.

The management service 120 can also determine that the comprehensiveness definition 137 indicates that a particular version of the application 147 should be used when states 149 indicate a 64-bit versions of Windows® and the current smart application 703 does not evaluate this state 149 or provide the version of the application 147. The management service 120 can generate a recommendation that provides a set of workflow objects 135 that provides the particular version of the application 147 for client devices 106 executing 64-bit versions of Windows®. A user can drag-and-drop, select, or otherwise manipulate the recommended set of workflow objects 135 to include it in the smart application 703.

Figure 8:
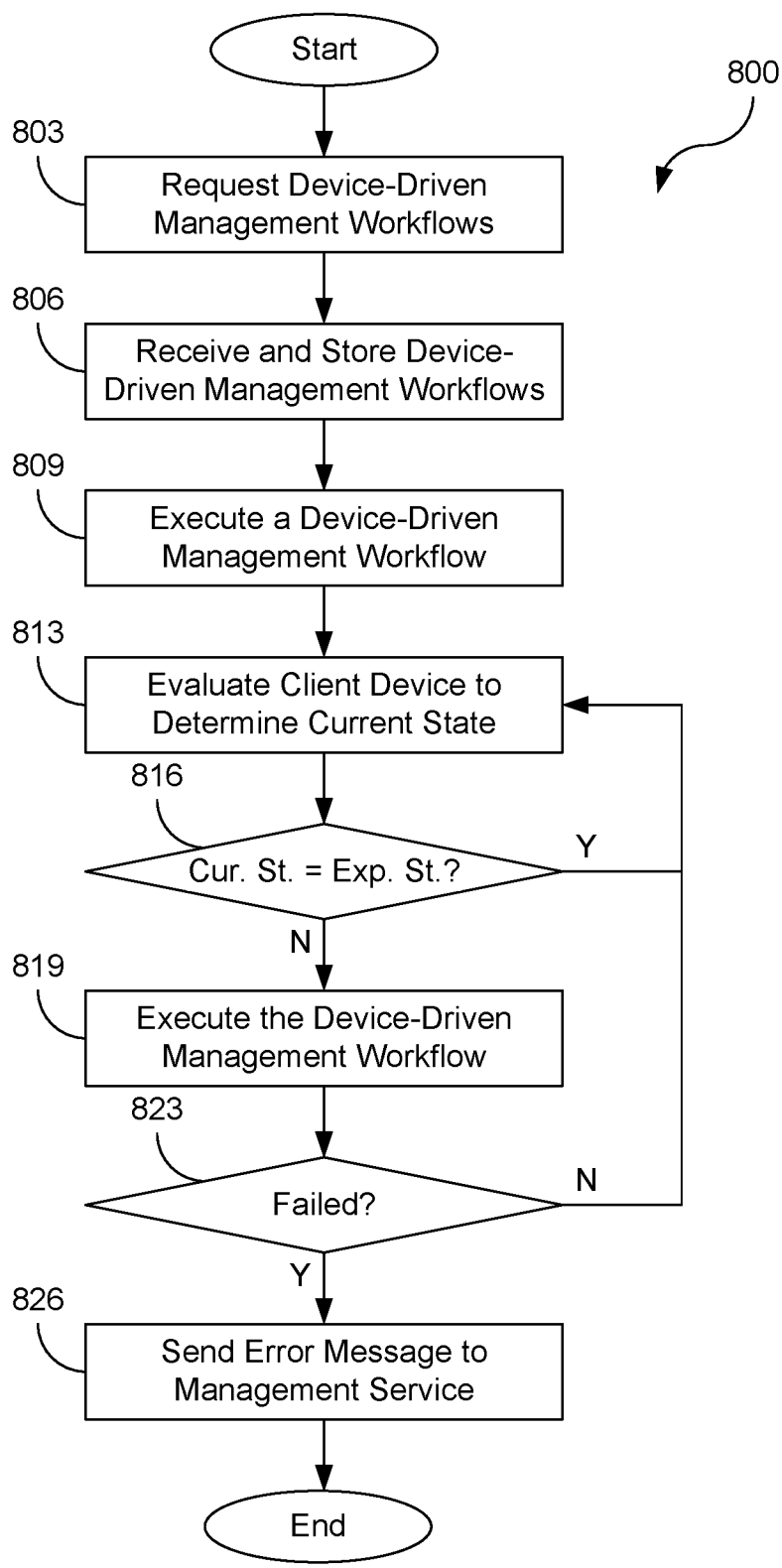
FIG. 8 illustrates another flowchart performed by components of the networked environment for device-driven management, according to various examples described herein.

FIG. 8 shows a flowchart 800 performed by components of the networked environment 100. Specifically, the flowchart 800 describes how the management agent 145 can monitor changes in the state 149 of a client device 106 and remediate those changes to the state 149. While the flowchart 800 is described as performed by the management agent 145, it can also be considered functionality performed by the client device 106. Certain functionality described for the flowchart 800 can also be performed by other components of the networked environment 100. Segmentation and ordering indicated in the flowchart 800 is for example purposes only. The functionality described for a particular step can be performed in any order relative to the other steps described.

Beginning with step 803, the management agent 145 can send a request to the management service 120 for one or more device-driven management workflows 139. This could be done periodically (e.g., as part of a regular polling request or checking by the management agent 145) or in response to an event (e.g., registration of the client device 106 with the management service 120).

Next at step 806, the management agent 145 can receive any device-driven management workflows 139 from the management service 120 that have been specified for the client device 106. For example, the management agent 145 could access the command queue 123 and retrieve the device-driven management workflows 139 from the command queue 123 that were placed in the command queue 123 by the management service 120 in response to the request sent at step 803. The device-driven management workflows 139 can be stored by the management agent 145 for later evaluation and/or execution.

Moving on to step 809, the management agent 145 can subsequently execute or process one of the device-driven management workflows 139. To process the device-driven management workflow 139, the management agent 145 could evaluate the ASL file that defines the device-driven management workflow 139 and implement the individual tasks 140 in the order specified.

Proceeding to step 813, the management agent 145 can evaluate the client device to determine the current state 149 of the client device 106. This could be done through a number of approaches. For example, the management agent 145 could put together a list of resources (e.g., configuration files, applications 147, libraries, etc.) installed on the client device 106 and their current versions. The list of resources could be assembled, in some instances, by directly searching for installed applications 147 or similar resources on the client device 106 and analyzing their configurations and/or properties. In some instances, the management agent 145 could search for resources or configurations based on the existing device-driven management workflows 139 installed on the client device 106 and/or policies 131 or entitlements assigned to the client device 106.

Then at step 816, the management agent 145 can determine whether the current state 149 of the client device 106, as determined previously at step 813, matches an expected state 149 of the client device 106. For example, the management agent 145 could evaluate the device-driven management workflows 139 to determine their result, and then compare the current state 149 of the client device 106 with the expected result of the device-driven management workflows 139. For example, if the result of a device-driven management workflow 139 were to have a resource installed on the client device 106 (e.g., an application 147, library, configuration file, etc.), then the device-driven management agent 145 could determine whether the version of the resource currently installed on the client device 106 were equal to or more recent than the version specified in the device-driven management workflow 139. Likewise, the device-driven management agent 145 could determine whether the resource were even installed on the client device 106.

Similarly, the management agent 145 could also evaluate one or more entitlements or policies assigned to and stored on the client device 106. These entitlements or policies could specify that a particular resource or version of a resource be installed on the client device 106 or that the client device 106 be configured in a particular manner. Unlike device-driven management workflows 139, a policy or entitlement will specify the desired configuration, without specifying individual tasks 140 to accomplish to achieve the desired or specified result.

If the current state 149 of the client device 106 matches the expected state 149 of the client device 106, then the process can return to step 813 for reevaluation of the current state 149 at a later time in order to continue to ensure that the current state 149 of the client device 106 matches the expected state 149 of the client device 106. However, if the current state 149 fails to match the expected state 149 of the client device, then the process can proceed to step 819.

Next at step 819, the management agent 145 execute or reexecute the device-driven management workflow 139. As previously discussed, to process the device-driven management workflow 139, the management agent 145 could evaluate the ASL file that defines the device-driven management workflow 139 and implement the individual tasks 140 in the order specified. In contrast to step 813, where the device-driven management workflow 139 is contemplated as having been originally executed, the device-driven management workflow is executed a second time at 819 to correct the current state 149 of the client device 106 so that is matches the expected state 149. For example, if the expected state 149 were that the client device 106 be encrypted, but a user had decrypted his or her client device 106, then the device-driven management workflow 139 for encrypting the client device 106 could be reexecuted in order to reencypt the client device 106. As another example, if the expected state 149 were that the client device 106 have at least a particular version of a resource (e.g., configuration file, application, library, etc.) installed, but the resource was no longer present on the client device (e.g., because a user had deleted, removed, or uninstalled the resource), then the appropriate device-driven management workflow 139 could be reexecuted in order to reinstall the missing resource.

Proceeding to step 823, the management agent 145 can determine whether execution of the device-driven management workflow 139 at step 819 failed. This could be done, for example, by comparing the current state 149 of the client device 106 to the expected state 149 to see if they match. A match could indicate that the execution of the device-driven management workflow 139 had been successful, while a failure to match could indicate that execution of the device-driven management workflow 139 was unsuccessful. As another example, the management agent 145 could evaluate the recorded state 149 of the device-driven management workflow 139. If the execution of the device-driven management workflow 139 had been observed to have been unsuccessful (e.g., because one or more tasks 140 had been recorded as failing), then the device-driven management workflow 139 could be considered to have failed to execute at step 823. Likewise, if the device-driven management workflow 139 had returned an error code upon completion or had timed-out during execution, the management agent 145 could conclude that the execution of the device-driven management workflow 139 had failed. If execution of the device-driven management workflow 139 had failed, then the process proceeds to step 826. If execution was successful, however, then the management agent 145 could determine that any observed discrepancy between the expected state 149 and current state 149 of the client device 106 had been resolved. In these instances, the process can return to step 813 for reevaluation of the current state 149 at a later time in order to continue to ensure that the current state 149 of the client device 106 matches the expected state 149 of the client device 106.

Moving on to step 826, the management agent 145 can send an error message to the management service 120. The error message could include an indication that execution of the device-driven management workflow 139 failed, which could be presented by the management service 120 to a user through the user interface of the management console 121. The error message could also include additional information, such as the current state 149 of the client device 106, the specific task(s) 140 that caused the device-driven management workflow 139 to fail, etc. Once the error message is provided by to the management service 120, the process can end.

Figure 9:
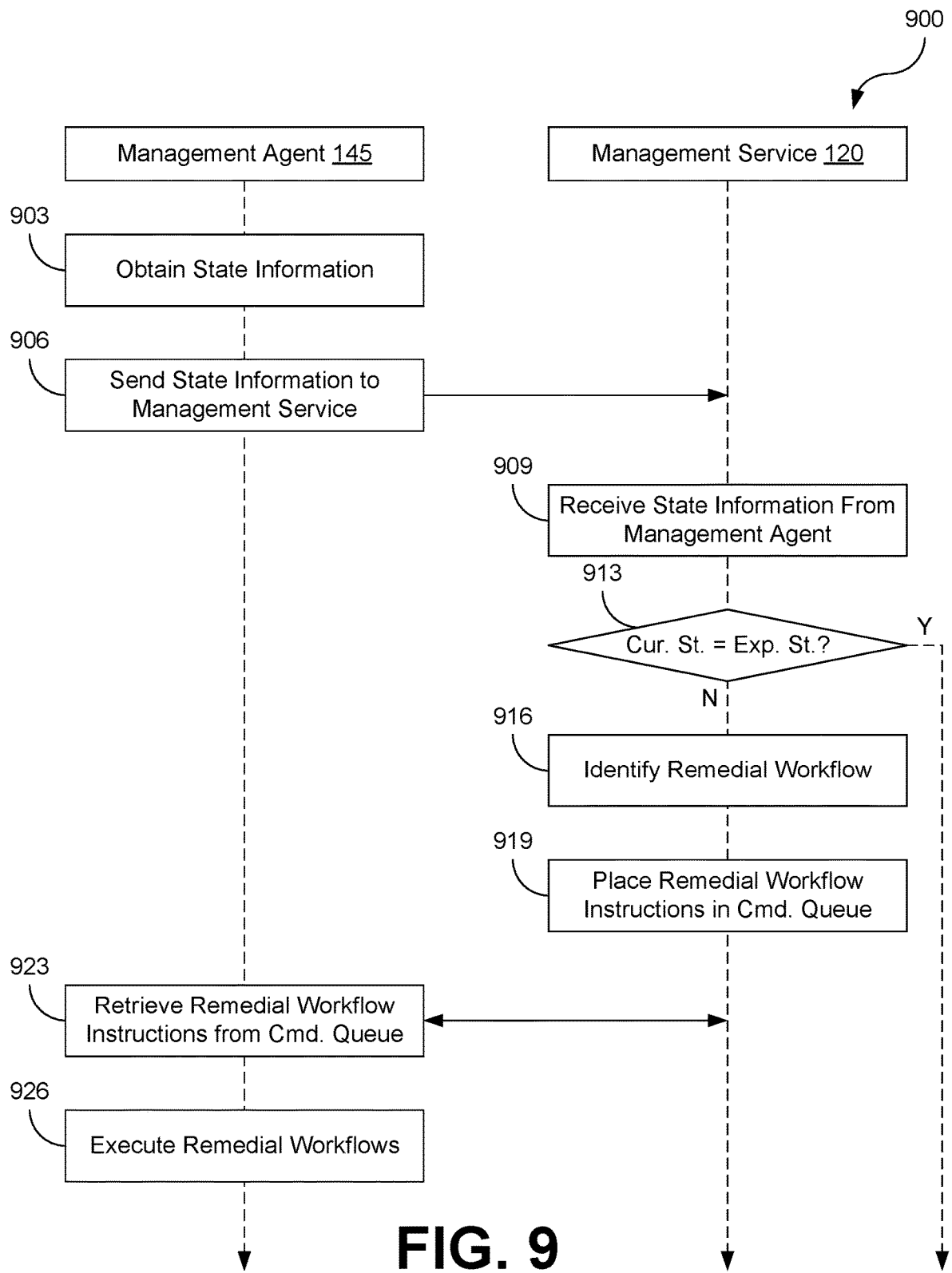
FIG. 9 illustrates a sequence diagram performed by components of the networked environment for device-driven management, according to various examples described herein.

FIG. 9 shows a sequence diagram 900 performed by components of the networked environment 100. Specifically, the sequence diagram 900 describes how the management service 120 can monitor changes in the state 149 of a client device 106 and remediate those changes to the state 149 in cooperation with the management agent 145. While the flowchart 900 is described as performed by the management service 120, it can also be considered functionality performed by the client device 106. Certain functionality described for the flowchart 900 can also be performed by other components of the networked environment 100. Segmentation and ordering indicated in the flowchart 900 is for example purposes only. The functionality described for a particular step can be performed in any order relative to the other steps described.

Beginning with step 903, the management agent 145 can obtain state information about the current state 149 of the client device 106. In some implementations, the management agent 145 may be able to obtain this information directly by viewing individual resources (e.g., configuration files, applications 147, libraries, etc.) installed on the client device 106 or observing the current configuration of the client device 106. However, some state information may not be obtainable or observable by the management agent 145. For example, the management agent 145 may be unable to observe some aspects of the current configuration of the client device 106, such as whether device encryption is enabled and the device is encrypted when at rest. As another example, the management agent 145 may be unable to access resources within a sandbox to confirm the version of the resource or whether the resource is currently installed. In these situations, the management agent 145 may invoke one or more functions or services provided by the operating system 143 of the client device 106. The operating system 143 could then provide the requested state 149 information to the client device 106 in return.

Then at step 906, the management agent 145 can provide the information about the current state 149 to the management service 120. This could be done, for example, by invoking an application programming interface (API) function provided by the management service 120 to receive a message. As another example, the management agent 145 could place the current state 149 information into the command queue 123, which the management service 120 could then retrieve.

Next, at step 909, the management service 120 receives information about the current state 149 of the client device. This could be received directly from the management agent 145 (e.g., as value or input to an API call or message passing interface provided by the management service 120) or by reviewing the command queue 123 at periodic intervals for a message from the management agent 145 containing the current state 149 of the client device 106.

Moving on to step 913, the management service 120 could determine whether the current state 149 of the client device 106, as received at step 909, matches the expected state 149 of the client device 106. For example, the management service 120 could track the individual policies 131, entitlements, or device-driven management workflows 139 assigned to the client device 106. The management service 120 could then determine whether any configurations specified by the policies 131 assigned to the client device 106 or any configurations implemented by a device-driven management workflow 139 assigned to the client device 106 fail to match the current configuration of the client device 106. Similarly, the management service 120 could determine whether any resources (e.g., configuration files, applications 147, libraries, etc.) specified as required to be installed by a policy 131 or installed as the result of execution of a device-driven management workflow 139 are missing from the client device 106. Similarly, if an application 147 that is less than the version expected to be installed on the client device 106 is found, this could be considered a failure of the current state 149 of the client device 106 to match the expected state 149 of the client device 106. If the expected state 149 matches the current state 149, then the process can end. However, if the expected state 149 fails to match the current state 149, then the process can continue to step 916.

Then at step 916, the management service 120 can identify a remedial workflow, which is a device-driven management workflow 139 that, if successfully executed, would result in the current state 149 of the client device 106 matching the expected state 149 of the client device 106. For example, if an expected application 147 were missing from the client device 106, or if an unexpected version of the expected application 147 were installed on the client device 106, then the management service 120 could identify an appropriate device-driven management workflow 139 to remedy the situation. Similarly, if the client device 106 was not configured as expected (e.g., it was unencrypted when device encryption was expected to be enabled), then the management service 120 could identify an appropriate device-driven management workflow 139 to resolve the misconfiguration of the client device 106.

Proceeding to step 919, the management service 120 can place an instruction to perform the remedial workflow identified at step 916 in a command queue 123 accessible to the client device 106. In some implementations, a copy of the device-driven management workflow 139 itself could also be placed in the command queue 123. This could be done if the management service 120 determines that the client device 106 lacks a copy of the device-driven management workflow 139.

Next at step 923, the management agent 145 retrieves the instructions to perform the specified remedial workflow from the command queue 123. The management agent 145 could also retrieve a copy of the remedial workflow from the command queue 123 if it were included in the command queue by the management service 120.

Then at step 926, the management agent 145 could process the remedial workflows retrieved from the command queue 123. To process the remedial workflow, the management agent 145 could evaluate the ASL file that defines the remedial workflow and implement the individual tasks 140 in the order specified. As a result of the processing of the remedial workflow, the current state 149 of the client device 106 should come to match the expected state 149 of the client device. The process could then end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z, etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system comprising:
a first computing device comprising a processor and a memory; and
machine-readable instructions stored in the memory that, when executed by the processor, cause the first computing device to at least:
receive a first state of a second computing device;
determine that the first state of the second computing device does not match an expected state for the second computing device;
identify, based at least on a device type of the device, an operating system platform of the device, a comparison of the expected state for the second computing device and the first state of the second computing device, a remedial device-driven workflow that, after being executed by the second computing device, will result in a second state of the second computing device matching the expected state for the second computing device, the remedial device-driven workflow employing at least an operating system application program interface (API) to produce the second state of the second computing device;
send the remedial workflow to the second computing device; and
send an instruction to execute the remedial workflow to the second computing device.

2. The system of claim 1, wherein the machine-readable instructions, when executed by the processor, further cause the first computing device to at least:
place, in response to identifying the remedial workflow, the remedial workflow onto a command queue; and
place, in response to identifying the remedial workflow, the instruction to execute the remedial workflow onto the command queue.

3. The system of claim 2, wherein the machine-readable instructions that cause the first computing device to send the remedial workflow to the second computing device are executed by the processor in response to receiving a request to obtain data from the command queue and wherein the machine-readable instructions that cause the first computing device to send the instruction to execute the remedial workflow to the second computing device are executed by the processor in response to receiving the request to obtain data from the command queue.

4. The system of claim 1, wherein the machine-readable instructions that cause the first computing device to determine that the first state of the second computing device does not match the expected state for the second computing device further cause the first computing device to at least:
  select a required resource from the expected state;
  search the first state of the second computing device for the required resource; and
  determine, in response to failing to find the required resource within the first state of the second computing device, that the first state of the second computing device does not match the expected state for the second computing device.

5. The system of claim 4, wherein the required resource is a name of at least one of a configuration file, an application, or a library.

6. The system of claim 4, wherein the remedial workflow is configured to install, when executed by the second computing device, the required resource on the second computing device.

7. The system of claim 1, wherein the machine-readable instructions, when executed by the processor, further cause the first computing device to at least:
  receive the second state of the second computing device; and
  determine that the second state of the second computing device matches the expected state for the second computing device.

8. A method, comprising:
  receiving, by a first computing device, a first state of a second computing device;
  determining, by the first computing device, that the first state of the computing device does not match an expected state for the second computing device;
  identifying, by the first computing device and based at least on a device type of the device, an operating system platform of the device, and a comparison of the expected state for the second computing device and the first state of the second computing device, a remedial device-driven workflow that, after being executed by the second computing device, will result in a second state of the second computing device matching the expected state for the second computing device, the remedial device-driven workflow employing at least an operating system application program interface (API) to produce the second state of the second computing device;
  sending, by the first computing device, the remedial workflow to the second computing device; and
  sending, by the first computing device, an instruction to execute the remedial workflow to the second computing device.

9. The method of claim 8, further comprising:
  placing, by the first computing device in response to identifying the remedial workflow, the remedial workflow onto a command queue; and
  placing, by the first computing device in response to identifying the remedial workflow, the instruction to execute the remedial workflow onto the command queue.

10. The method of claim 9, wherein sending, by the first computing device, the remedial workflow to the second computing device are executed by the processor in response to receiving a request to obtain data from the command queue and wherein sending, by the first computing device, the instruction to execute the remedial workflow to the second computing device are executed by the processor in response to receiving the request to obtain data from the command queue.

11. The method of claim 8, wherein determining, by the first computing device, that the first state of the second computing device does not match the expected state for the second computing device further comprises:
  selecting, by the first computing device, a required resource from the expected state;
  searching, by the first computing device, the first state of the second computing device for the required resource; and
  determining, by the first computing device in response to failing to find the required resource within the first state of the second computing device, that the first state of the second computing device does not match the expected state for the second computing device.

12. The method of claim 11, wherein the required resource is a name of at least one of a configuration file, an application, or a library.

13. The method of claim 11, wherein the remedial workflow is configured to install, when executed by the second computing device, the required resource on the second computing device.

14. The method of claim 8, further comprising:
  receiving, by the first computing device, the second state of the second computing device; and
  determining, by the computing device, that the second state of the second computing device matches the expected state for the second computing device.

15. The non-transitory, computer-readable medium comprising machine-readable instructions that, when executed by a process of a first computing device, cause the first computing device to at least:
  receive a first state of a second computing device;
  determine that the first state of the second computing device does not match an expected state for the second computing device;
  identify, based at least on a device type of the device, an operating system platform of the device, a comparison of the expected state for the second computing device and the first state of the second computing device, a remedial device-driven workflow that, after being executed by the second computing device, will result in a second state of the second computing device matching the expected state for the second computing device, the remedial device-driven workflow employing at least an operating system application program interface (API) to produce the second state of the second computing device;
  send the remedial workflow to the second computing device; and
  send an instruction to execute the remedial workflow to the second computing device.

16. The non-transitory, computer-readable medium of claim 15, wherein the machine-readable instructions, when executed by the processor, further cause the first computing device to at least:
  place, in response to identifying the remedial workflow, the remedial workflow onto a command queue; and
  place, in response to identifying the remedial workflow, the instruction to execute the remedial workflow onto the command queue.

17. The non-transitory, computer-readable medium of claim 16, wherein the machine-readable instructions that cause the first computing device to send the remedial workflow to the second computing device are executed by the processor in response to receiving a request to obtain data from the command queue and wherein the machine-readable instructions that cause the first computing device to send the instruction to execute the remedial workflow to the second computing device are executed by the processor in response to receiving the request to obtain data from the command queue.

18. The non-transitory, computer-readable medium of claim 15, wherein the machine-readable instructions that cause the first computing device to determine that the first state of the second computing device does not match the expected state for the second computing device further cause the first computing device to at least:
   select a required resource from the expected state;
   search the first state of the second computing device for the required resource; and
   determine, in response to failing to find the required resource within the first state of the second computing device, that the first state of the second computing device does not match the expected state for the second computing device.

19. The non-transitory, computer-readable medium of claim 18, wherein the remedial workflow is configured to install, when executed by the second computing device, the required resource on the second computing device.

20. The non-transitory, computer-readable medium of claim 15, wherein the machine-readable instructions, when executed by the processor, further cause the first computing device to at least:
   receive the second state of the second computing device; and
   determine that the second state of the second computing device matches the expected state for the second computing device.

* * * * *